United States Patent
Luo et al.

(10) Patent No.: US 12,113,953 B2
(45) Date of Patent: Oct. 8, 2024

(54) THREE-DIMENSIONALIZATION METHOD AND APPARATUS FOR TWO-DIMENSIONAL IMAGE, DEVICE AND COMPUTER-READABLE STORAGE MEDIUM

(71) Applicant: TENCENT TECHNOLOGY (SHENZHEN) COMPANY LIMITED, Shenzhen (CN)

(72) Inventors: Yue Luo, Shenzhen (CN); Yu Li, Shenzhen (CN); Ying Shan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 35 days.

(21) Appl. No.: 18/077,549

(22) Filed: Dec. 8, 2022

(65) Prior Publication Data
US 2023/0113902 A1 Apr. 13, 2023

Related U.S. Application Data

(63) Continuation of application No. PCT/CN2021/104972, filed on Jul. 7, 2021.

(30) Foreign Application Priority Data

Aug. 24, 2020 (CN) .......................... 202010856161.6

(51) Int. Cl.
H04N 13/268 (2018.01)
G06T 5/70 (2024.01)
(Continued)

(52) U.S. Cl.
CPC ............ *H04N 13/268* (2018.05); *G06T 5/70* (2024.01); *G06T 5/77* (2024.01); *G06T 7/20* (2013.01); *G06T 7/50* (2017.01); *H04N 13/15* (2018.05)

(58) Field of Classification Search
CPC . G06T 2207/10024; G06T 2207/20084; G06T 5/70; G06T 5/77; G06T 7/20;
(Continued)

(56) References Cited

U.S. PATENT DOCUMENTS 9,736,449 B1 8/2017 Fan
10,154,242 B1 * 12/2018 Fan ...................... H04N 13/128
(Continued)

FOREIGN PATENT DOCUMENTS

CN 102724529 A 10/2012
CN 108900825 A 11/2018
(Continued)

OTHER PUBLICATIONS

The World Intellectual Property Organization (WIPO) International Search Report for PCT/CN2021/104972 Sep. 8, 2021 6 Pages (including translation).
(Continued)

*Primary Examiner* — Christopher S Kelley
*Assistant Examiner* — Ana Picon-Feliciano
(74) *Attorney, Agent, or Firm* — ANOVA LAW GROUP, PLLC

(57) ABSTRACT

This application provides a three-dimensionalization method and apparatus for a two-dimensional image, an electronic device, and a computer-readable storage medium. The method includes performing depth perception processing on a two-dimensional image, to obtain a depth value of each pixel in the two-dimensional image; performing migration processing on the two-dimensional image from multiple
(Continued)

perspectives, to obtain a migration result of the two-dimensional image corresponding to each perspective; determining a color value of each pixel in a migration image corresponding to each perspective, based on the depth value of each pixel in the two-dimensional image and the migration result of the two-dimensional image corresponding to each perspective; generating, based on the color value of each pixel in the migration image of each perspective, the migration image corresponding to the perspective; and encapsulating the migration images of the multiple perspectives in an order, to obtain a three-dimensional video.

20 Claims, 11 Drawing Sheets

(51) Int. Cl.
*G06T 5/77* (2024.01)
*G06T 7/20* (2017.01)
*G06T 7/50* (2017.01)
*H04N 13/15* (2018.01)

(58) Field of Classification Search
CPC ........ G06T 7/50; H04N 13/128; H04N 13/15; H04N 13/257; H04N 13/261; H04N 13/264; H04N 13/268
USPC .......................................................... 348/43
See application file for complete search history.

(56) References Cited

U.S. PATENT DOCUMENTS

| | | | |
|---|---|---|---|
| 2005/0094900 A1* | 5/2005 | Abe | G06T 7/12 382/300 |
| 2007/0279415 A1* | 12/2007 | Sullivan | H04N 13/261 348/E13.02 |
| 2021/0142497 A1* | 5/2021 | Pugh | G06T 7/194 |

FOREIGN PATENT DOCUMENTS

| | | |
|---|---|---|
| CN | 110390712 A | 10/2019 |
| CN | 111193919 A | 5/2020 |
| CN | 111970503 A | 11/2020 |
| EP | 3057066 A1 | 8/2016 |

OTHER PUBLICATIONS

Meng-Li Shih et al., "3D Photography using Context-aware Layered Depth Inpainting", https://shihmengli.github.io/3D-Photo-Inpainting.

Ren'e Ranftl et al., "Towards Robust Monocular Depth Estimation: Mixing Datasets for Zero-shot Cross-dataset Transfer", 2020, IEEE Transactions on Pattern Analysis and Machine Intelligence.

Jiahui Yu et al., "Free-Form Image Inpainting with Gated Convolution", p. 4471-4480, CVF.

The European Patent Office (EPO) The Extended European Search Report for 21859902.5. Jul. 31, 2023 11 Pages (including translation).

* cited by examiner

THREE-DIMENSIONALIZATION METHOD AND APPARATUS FOR TWO-DIMENSIONAL IMAGE, DEVICE AND COMPUTER-READABLE STORAGE MEDIUM

RELATED APPLICATIONS

This application is a continuation application to PCT Application No. PCT/CN2021/104972, filed on Jul. 7, 2021, which claims priority to Chinese Patent Application No. 202010856161.6 filed on Aug. 24, 2020. The two applications are both incorporated herein by reference in their entirety.

FIELD OF THE TECHNOLOGY

This application relates to the field of image processing technologies, and specifically to a three-dimensionalization method and apparatus for a two-dimensional image, an electronic device, and a computer-readable storage medium.

BACKGROUND OF THE DISCLOSURE

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result.

Image processing is an application of AI. As Internet technologies advance, an increasing number of application products provide a function of displaying images in a diversified manner. Related application products can not only display a two-dimensional image, but also perform three-dimensionalization processing on the two-dimensional image, to display a three-dimensional video related to content of the two-dimensional image. In these scenarios, the generation of the three-dimensional video mainly relies on three-dimensional modeling based on a multi-angle camera, which, consumes computational and time resources.

SUMMARY

The embodiments of this application provide a three-dimensionalization method and apparatus for a two-dimensional image, an electronic device, and a computer-readable storage medium, which can quickly and accurately generate a three-dimensional video based on a two-dimensional image.

The technical solutions in the embodiments of this application are implemented as follows.

An embodiment of this application provides a three-dimensionalization method for a two-dimensional image, performed by an electronic device. The method includes performing depth perception processing on a two-dimensional image, to obtain a depth value of each pixel in the two-dimensional image; performing migration processing on the two-dimensional image from multiple perspectives, to obtain a migration result of the two-dimensional image corresponding to each perspective; determining a color value of each pixel in a migration image corresponding to each perspective, based on the depth value of each pixel in the two-dimensional image and the migration result of the two-dimensional image corresponding to each perspective; generating, based on the color value of each pixel in the migration image of each perspective, the migration image corresponding to the perspective; and encapsulating the migration images of the multiple perspectives in an order, to obtain a three-dimensional video.

An embodiment of this application provides a three-dimensionalization method for a two-dimensional image, performed by an electronic device, and including displaying a two-dimensional image on a human-computer interaction interface; and playing a three-dimensional video generated based on the two-dimensional image, in response to a three-dimensionalization operation for the two-dimensional image; the video being obtained by performing the three-dimensionalization method for a two-dimensional image according to any of the embodiments of this application.

An embodiment of this application provides a non-transitory computer-readable storage medium, storing an executable instruction, the executable instruction, when executed by a processor, performing the three-dimensionalization method for a two-dimensional image according to any of the embodiments of the application.

The embodiments of this application have the following beneficial effects:

By performing the migration processing on the two-dimensional image from multiple perspectives and generating the migration images of the corresponding perspectives, the embodiments of this application realize a perspective transformation process at a two-dimensional image level to realize the image three-dimensionalization process at a two-dimensional image processing level, thereby replacing the three-dimensional scene modeling process. The embodiments of this application reduce computational cost and time cost of a backend or a terminal while accurately performing the two-dimensional image three-dimensionalization processing to generate three-dimensional video.

DESCRIPTION OF EMBODIMENTS

Figure 1:
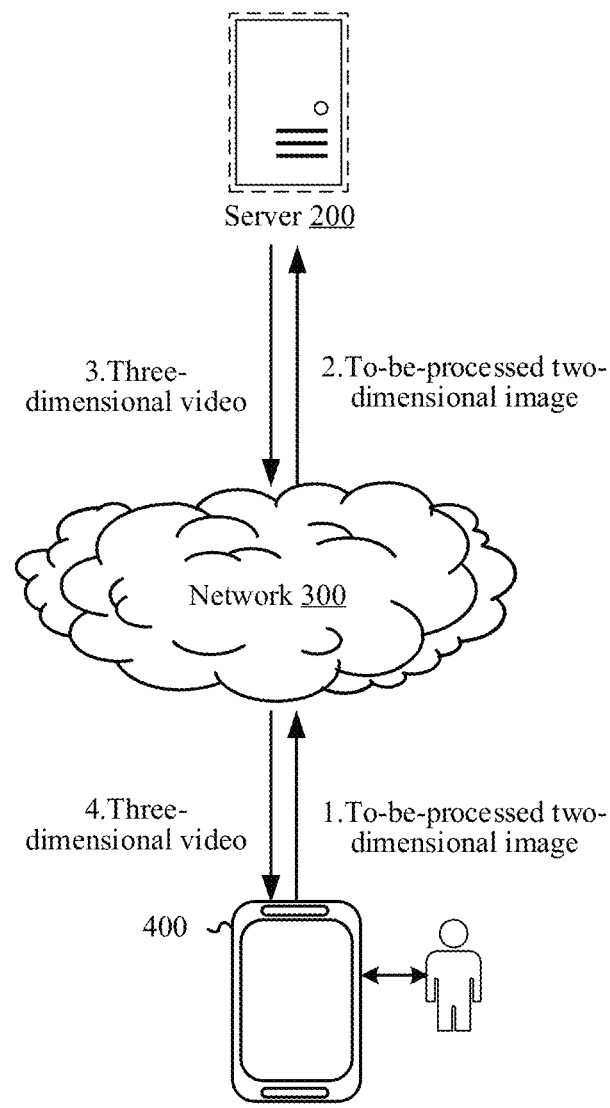
FIG. 1 is a schematic structural diagram of a three-dimensionalization system for a two-dimensional image according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Depth map: In three-dimensional computer graphics and computer vision, a depth map is an image or image channel, which includes information relating to distances of surfaces of scene objects from a viewpoint, and is used for simulating three-dimensional shapes or reconstructing three-dimensional shapes. The depth map may be generated by a three-dimensional scanner.

2) Pixel: A digital image is a two-dimensional signal that records grayscales or colors of the image in row and column directions. A pixel is the smallest logical unit of a computer image.

3) Depth estimation: depth information of an image is estimated based on the image. The depth estimation may be performed based on image content understanding, based on focus, based on defocus, or based on light and shade changes. The depth estimation approach based on image content understanding is mainly by classifying scene objects in an image, and then estimating depth information of the scene object of each class using a suitable approach.

In the related art, an approach for solving a problem of generating a video with a three-dimensional visual effect based on a two-dimensional image is to predict depth information of a scene through deep learning, perform three-dimensional modeling on the scene and perform filling prediction on an occluded part, re-render images from new perspectives by simulating motions of a camera and changing perspectives of the camera, to obtain images of the new perspectives, and then display the video with the three-dimensional effect. A three-dimensional video generation method in the related art is often performed by predicting depth information of a scene through deep learning, constructing the scene through three-dimensional modeling, performing filling on an occluded part through deep learning, re-rendering images from new perspectives by simulating motions of a camera, to obtain a video with a three-dimensional effect. However, the process of three-dimensional modeling is complex and time-consuming, which makes the entire calculation process complex and time-consuming, thus not suitable for supporting online functions with a low latency.

The embodiments of this application provide a three-dimensionalization method and apparatus for a two-dimensional image, an electronic device, and a computer-readable storage medium, which can quickly and accurately reconstruct images of different perspectives of a scene, to achieve image three-dimensionalization display. An application of the electronic device provided by the embodiments of this application is described below. The electronic device provided by the embodiments of this application may be a notebook computer, a tablet computer, a desktop computer, a set-top box, a smart home device such as a smart television, a mobile device (e.g., a mobile phone, a portable music player, a personal digital assistant, a dedicated message device, a portable game device) and other types of user terminals, and may be a server. The following describes the application in which the device is implemented as a server.

Referring to FIG. 1, it is a schematic structural diagram of a three-dimensionalization system for a two-dimensional image according to an embodiment of this application. In order to support an image editing application, a terminal 400 is connected to a server 200 through a network 300. The network 300 may be a wide area network or a local area network, or a combination of the two. The terminal 400 uploads a to-be-processed image to the server 200. The server 200 performs three-dimensionalization processing for the two-dimensional image, to obtain a three-dimensional video corresponding to the to-be-processed image. The server 200 transmits the three-dimensional video back to the terminal 400, to allow the terminal 400 to play the three-dimensional video.

In some embodiments, while uploading the to-be-processed image to the server 200, the terminal 400 may transmit a rendering mode specified by an image three-dimensionalization operation to the server 200, to allow the server 200 to determine corresponding multiple perspectives according to the rendering mode, and an encapsulation order of migration images. The server 200 obtains the migration images corresponding to the multiple perspectives according to the corresponding perspectives, encapsulates the migration images in the encapsulation order, to generate a three-dimensional video, and transmits the three-dimensional video back to the terminal 400 for playing.

In FIG. 1, the description is made using the terminal 400 and the server 200 cooperating to complete the three-dimensionalization processing for the two-dimensional image as an example. As an alternative solution, the terminal 400 may complete the three-dimensionalization processing for the two-dimensional image depending on its own capabilities.

In some embodiments, the terminal 400 performs the three-dimensionalization method for a two-dimensional image provided by the embodiments of this application by running a computer program. For example, the computer program may be a native program or software modules in an operating system; or may be a native application (APP), namely an application that needs to be installed in the operating system to run, such as a video APP or a live broadcast APP; or may be a mini program, namely a program that only needs to be downloaded into a browser environment to run; or may be a video applet or a live broadcast applet that can be embedded into any APP. In summary, the foregoing computer program may be any form of application, module or plug-in.

In some embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this application.

Figure 2:
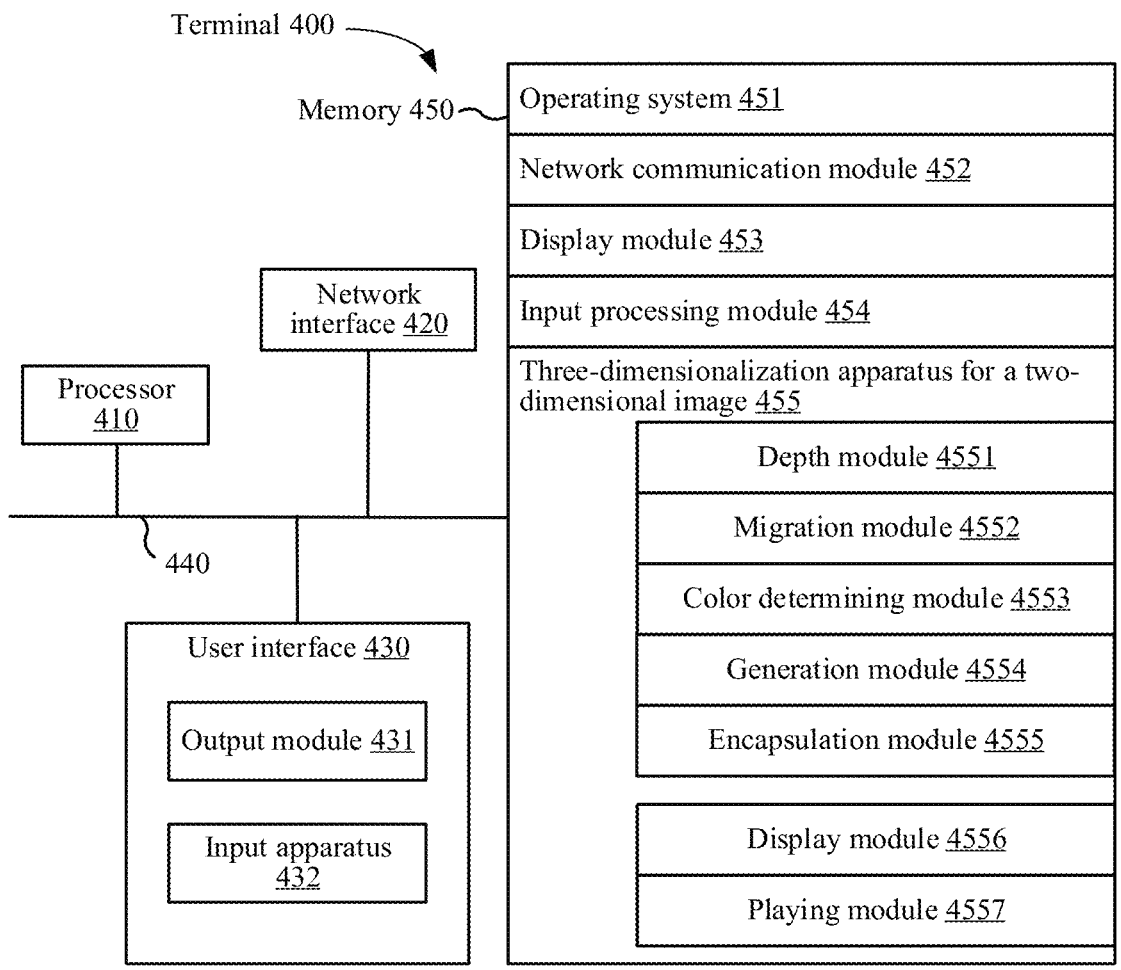
FIG. 2 is a schematic structural diagram of an electronic device applying a three-dimensionalization method for a two-dimensional image according to an embodiment of this application.

Referring to FIG. 2, it is a schematic structural diagram of an electronic device applying a three-dimensionalization method for a two-dimensional image according to an embodiment of this application. As an example, the electronic device is the terminal 400 that independently completes three-dimensionalization processing for a two-dimensional image depending on its own capabilities, and the terminal 400 as shown in FIG. 2 includes: at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are labeled as the bus system 440 in FIG. 2.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, an existing processor, or the like.

The user interface 430 includes one or more output apparatuses 431 that enable display of media content, including one or more speakers and/or one or more visual display screens. The user interface 430 further includes one or more input apparatuses 432, including user interface components that facilitate user input, such as a keyboard, a mouse, a microphone, a touch screen display, a camera, and other input buttons and controls.

The memory 450 may be a removable one, a non-removable one, or a combination of the two. A hardware device includes a solid-state memory, a hard drive, an optical drive, etc. The memory 450 may include one or more storage devices that are physically remote from the processor 410.

The memory 450 may be a volatile memory or a non-volatile memory, or may include a volatile memory and a non-volatile memory. The non-volatile memory may be a read only memory (ROM), and the volatile memory may be a random-access memory (RAM). The memory 450 described in this embodiment of this application is to include any other suitable type of memories.

In some embodiments, the memory 450 can store data to support various operations. Examples of the data include programs, modules, and data structures, or subsets or supersets thereof, as exemplified below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another electronic device through one or more (wired or wireless) network interfaces 420. Network interfaces 420 may include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, a three-dimensionalization apparatus for a two-dimensional image provided by the embodiments of this application may be implemented by software. FIG. 2 shows a three-dimensionalization apparatus 455 for a two-dimensional image stored in the memory 450. The three-dimensionalization apparatus 455 for a two-dimensional image may be software in the form of programs and plug-ins, including the following software modules: a depth module 4551, a migration module 4552, a color determining module 4553, a generation module 4554, an encapsulation module 4555, a display module 4556, and a playing module 4557. These modules are logical, thus can be arbitrarily combined or further split according to their functions. The functions of the modules are explained below.

In combination with the application and implementation of the electronic device provided by the embodiments of this application, the following describes a three-dimensionalization method for a two-dimensional image provided by the embodiments of this application, which may be independently completed by the terminal 400 or cooperatively completed by the terminal 400 and the server 200.

The three-dimensionalization method for a two-dimensional image according to this embodiment of this application is described, in combination with the application and implementation of the terminal provided by this embodiment of this application.

Figure 3A:
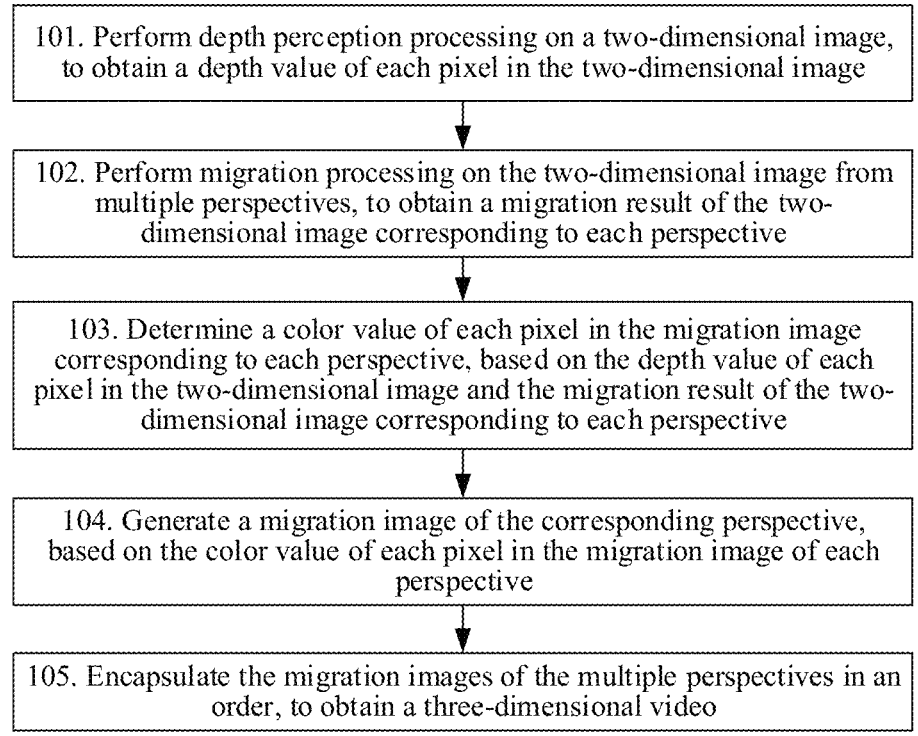
FIG. 3A to FIG. 3E are schematic flowcharts of a three-dimensionalization method for a two-dimensional image according to embodiments of this application.

Referring to FIG. 3A, which is a schematic flowchart of a three-dimensionalization method for a two-dimensional image according to an embodiment of this application, the description is made with reference to step 101 to step 105 as shown in FIG. 3A.

Step 101. Perform depth perception processing on a two-dimensional image, to obtain a depth value of each pixel in the two-dimensional image.

As an example, the depth value of a pixel in the two-dimensional image is a depth value of the pixel perceived using a depth perception algorithm, namely an original depth value hereinafter. The depth estimation problem belongs to three-dimensional reconstruction in the field of computer vision, which derives a depth distance from a relationship between spatial geometry, time domain transformation and focal length change. The depth estimation may be applied to three-dimensional modeling, scene understanding, image synthesis of depth perception, etc. The image depth estimation based on deep learning reflects a depth relationship by a pixel depth value relationship, and maps an image into a depth map by fitting a function. The monocular depth estimation generally uses image data of a single perspective as an input, and directly predicts a depth value corresponding to each pixel in the image.

Step 102. Perform migration processing on the two-dimensional image from multiple perspectives, to obtain a migration result of the two-dimensional image corresponding to each perspective.

As an example, the migration is to migrate each pixel in the two-dimensional image to a canvas having the same size as the two-dimensional image. The migration result corresponding to each perspective includes: a position of each pixel in the canvas of each perspective. The three-dimensionalization processing for the two-dimensional image may be based on different styles of three-dimensionalization processing, such as, forming a three-dimensional video as a camera is zoomed in, forming a three-dimensional video as a camera shakes, and forming a three-dimensional video as a camera is zoomed out. For different styles of three-dimensionalization processing, it is necessary to determine corresponding perspectives and an encapsulation order of migration images. In response to receiving a three-dimensionalization operation for a two-dimensional image, the terminal determines a rendering style specified by the three-dimensionalization operation, and further determines multiple perspectives corresponding to the rendering style and the encapsulation order of migration images of the corresponding perspectives. It is assumed that migration images of two perspectives need to be determined for a certain rendering style, that is, the migration processing needs to be performed on each pixel in the two-dimensional image from two perspectives, to respectively obtain migration results of the two perspectives.

Step 103. Determine a color value of each pixel in a migration image corresponding to each perspective, based on the depth value of each pixel in the two-dimensional image and the migration result of the two-dimensional image corresponding to each perspective.

In some embodiments, before performing the operation of determining a color value of each pixel in the migration image corresponding to each perspective, based on the depth value of each pixel in the two-dimensional image and the migration result of the two-dimensional image corresponding to each perspective in step 103, the following technical solution may be performed: using the depth value of each pixel in the two-dimensional image obtained through the depth perception processing as an original depth value; performing depth inpainting processing on the original depth value of each pixel in the two-dimensional image, to obtain an inpainted depth value of each pixel in the two-dimensional image; and replacing the corresponding original depth value based on the inpainted depth value of each pixel.

As an example, the technical solution of the depth inpainting processing is mainly used to perform depth edge inpainting on the depth values obtained through depth perception. The above process of performing the depth inpainting on the depth values may be performed before step 102, or performed after step 102 and before step 103.

Figure 5:
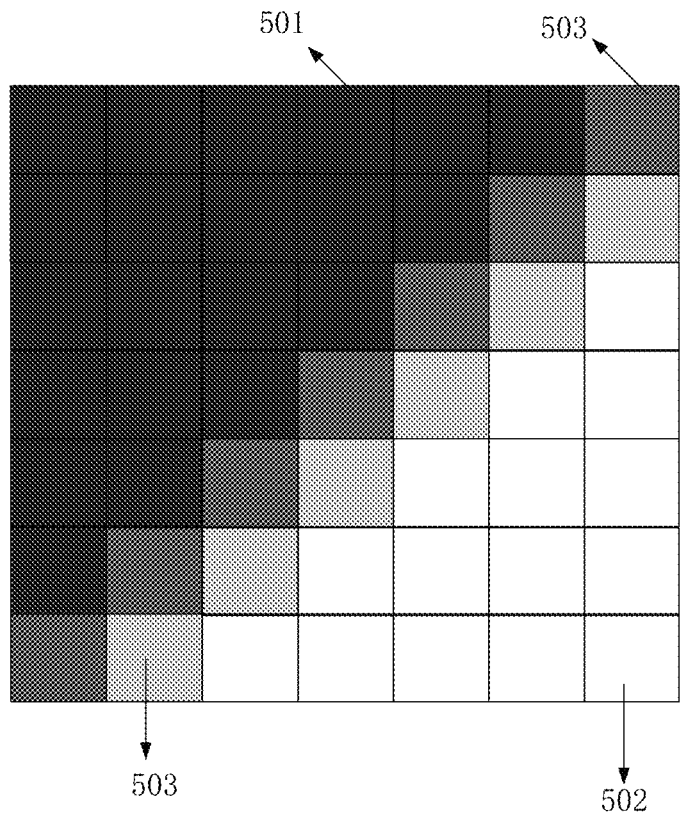
FIG. 5 is a depth map of a three-dimensionalization method for a two-dimensional image according to an embodiment of this application.

As an example, referring to FIG. 5, it is a depth map of a three-dimensionalization method for a two-dimensional image according to an embodiment of this application. The depth estimation result obtained in the depth perception process in step 101 produces uneven continuous jumps at edges. Each grid in FIG. 5 represents a pixel. A background object is black grids 501 and a foreground object is white grids 502. Theoretically, there is no gray grid therebetween, which is in line with the principle that the same object has the same depth. However, in FIG. 5, there is a discontinuous jump phenomenon, namely step jumps that the black grids 501 are adjacent to the gray grids 503, and the gray grids 503 are adjacent to the white grids 502, which results in different depth estimation results of the same object. Therefore, it is necessary to perform depth inpainting for the edges. The edge depths may be improved via of fast median replacement.

As an example, the white grids 502 characterize a foreground image of the two-dimensional image, and the black grids 501 characterize a background image of the two-dimensional image. A depth of the foreground image is smaller than a depth of the background image. The depth values at edges between two different color grids have relatively large jumps.

In some embodiments, the operation of performing depth inpainting processing on the original depth value of each pixel in the two-dimensional image, to obtain an inpainted depth value of each pixel in the two-dimensional image may be implemented by the following technical solution: determining edge pixels in the two-dimensional image and non-edge pixels in the two-dimensional image, based on the original depth value of each pixel in the two-dimensional image; determining a pixel that needs to be replaced in the two-dimensional image that needs to undergo median replacement, and a retained pixel in the two-dimensional image that does not need to undergo median replacement, based on the edge pixels; sorting the original depth values of all non-edge pixels in a connected region of the pixel that needs to be replaced in descending order, and using a median of a sort result in the descending order as the inpainted depth value of the pixel that needs to be replaced; and retaining the original depth value of the retained pixel as the inpainted depth value of the retained pixel.

In some embodiments, the operation of determining edge pixels in the two-dimensional image and non-edge pixels in the two-dimensional image, based on the original depth value of each pixel in the two-dimensional image may be implemented by the following technical solution: performing following processing for any one pixel in the two-dimensional image: determining the pixel as the non-edge pixel, when an absolute difference between a regularization processing result of the original depth value of the pixel and a regularization processing result of the original depth value of at least one adjacent pixel is not less than a difference threshold, the adjacent pixel being a pixel located at an adjacent position of the any one pixel; and determining the pixel as the edge pixel, when the absolute difference between the regularization processing result of the original depth value of the pixel and the regularization processing result of the original depth value of each adjacent pixel is less than the difference threshold.

As an example, the regularization processing is performed on the depth map obtained in the depth perception process, to reduce a value range of the depth map to an interval of 0 to 1, referring to formula (1):

$$\text{Norm}(D) = (D - D.\min)/(D.\max - D.\min) \qquad (1);$$

Where D.max refers to a maximum depth value of all the pixels in the depth map, Dmin refers to a minimum depth value of all the pixels in the depth map, and Norm(D) is the regularization processing result.

Figures 6, 7:
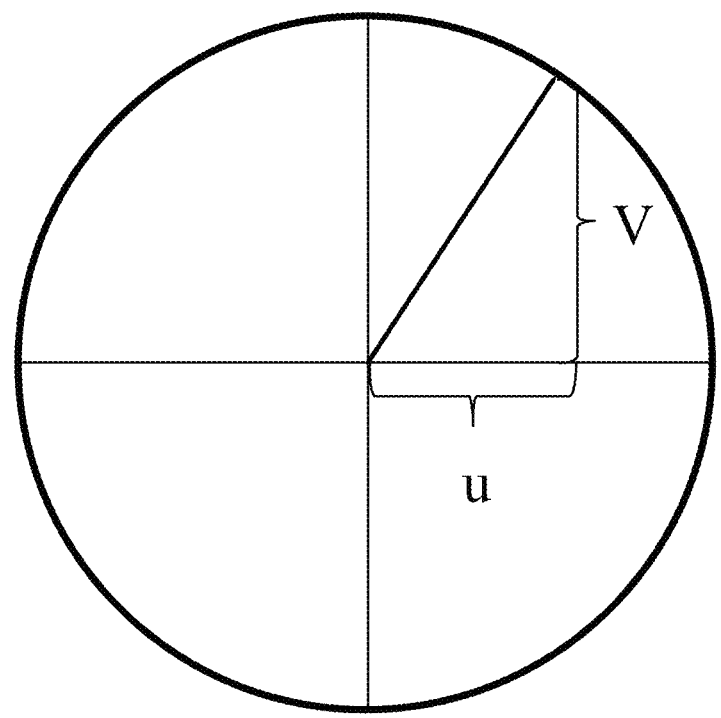
FIG. 6 is an edge marking map of a three-dimensionalization method for a two-dimensional image according to an embodiment of this application.
FIG. 7 is a schematic diagram of obtaining motion parameters in a three-dimensionalization method for a two-dimensional image according to an embodiment of this application.

For each pixel in the depth map, the absolute differences between the regularization processing result of each pixel in the depth map and the regularization processing results of adjacent four pixels on the top, bottom, left, and the right sides of this pixel are calculated, to determine whether this pixel is in an edge region. Referring to FIG. 6, which is an edge marking map of a three-dimensionalization method for a two-dimensional image according to an embodiment of this application, if all the absolute differences (the above four absolute values) are less than the difference threshold, for example, the difference threshold is set to 0.04, this pixel is marked as 1 and discriminated as the edge pixel; otherwise, this pixel is marked as 0 and discriminated as the non-edge pixel. For example, it is assumed that a regularized depth of a point is D (i, j), i denoting a horizontal position of this point, and j denoting a vertical position of this point, the determining is made with reference to equation (2):

$$\max(\text{abs}(D(i,j) - D(i+1,j)), \text{abs}(D(i,j) - D(i-1,j)), \text{abs}(D(i,j) - D(i,j+1)), \text{abs}(D(i,j) - D(i,j-1))) < \text{difference threshold};$$

Where abs(D(i, j)–D(i+1, j) is an absolute difference between the regularization processing result of the depth value of this pixel (i, j) and the regularization processing result of the depth value of a pixel (i+1, j); abs(D(i, j)–D(i–1, j)) is an absolute difference between the regularization processing result of the depth value of this pixel (i, j) and the regularization processing result of the depth value of a pixel (i–1, j); abs(D(i, j)–D(i, j+1)) is an absolute difference between the regularization processing result of the depth value of this pixel (i, j) and the regularization processing result of the depth value of a pixel (i, j+1); and abs(D(i, j)–D(i, j–1)) is an absolute difference between the regularization processing result of the depth value of this pixel (i, j) and the regularization processing result of the depth value of a pixel (i, j–1).

If a maximum value in the above four absolute differences is less than the difference threshold, this pixel is marked as 1, and discriminated as the edge pixel; otherwise, this pixel is marked as 0, and discriminated as the non-edge pixel.

In some embodiments, the operation of determining a pixel that needs to be replaced in the two-dimensional image that needs to undergo median replacement, and a retained pixel in the two-dimensional image that does not need to undergo median replacement, based on the edge pixels may be implemented by the following technical solution: performing following processing for any one pixel in the two-dimensional image: determining the pixel as the pixel that needs to be replaced, when there is at least one edge pixel in the connected region of the pixel; and determining the pixel as the retained pixel, when there is no edge pixel in the connected region of the pixel.

As an example, in the edge marking map as shown in FIG. 6, a connected region is delineated with each pixel as a center (central pixel). The connected region refers to a collection of a plurality of pixels that have direct and indirect connectivity with this pixel. Specifically, the connected region may be a k*k square with this pixel as a center. For example, a textured pixel as shown in FIG. 6 is used as a central pixel 602, and its connected region is a dashed box 601 of size 3*3 as shown in FIG. 6. If there is an edge pixel (a point marked as 1) in the connected region, the median replacement processing is performed on the central pixel; otherwise, the median replacement processing is not required.

As an example, a specific approach of the median replacement processing is as follows: determining a pixel (central pixel) that needs to undergo the median replacement processing; determining the pixel as the pixel that needs to be replaced, namely the pixel that needs to undergo the median replacement processing, when there is at least one edge pixel in the connected region of the pixel (central pixel); obtaining the depth values of all non-edge pixels from the connected region, and arranging these depth values from smallest to largest; and using a median after the arrangement to replace the depth value of the central pixel. The above processing is performed with each pixel in the two-dimensional image as the central pixel to complete a traversal of all the pixels, namely completing the depth inpainting processing on the depth values of the two-dimensional image. For the obtained depth map through the inpainting, a greater depth characterizes a farther visual distance of a pixel. The visual distance is used for characterizing a distance between a viewpoint and an object in the image. A visual distance of a long shot object is greater than a visual distance of a close-up shot object.

Figure 3B:
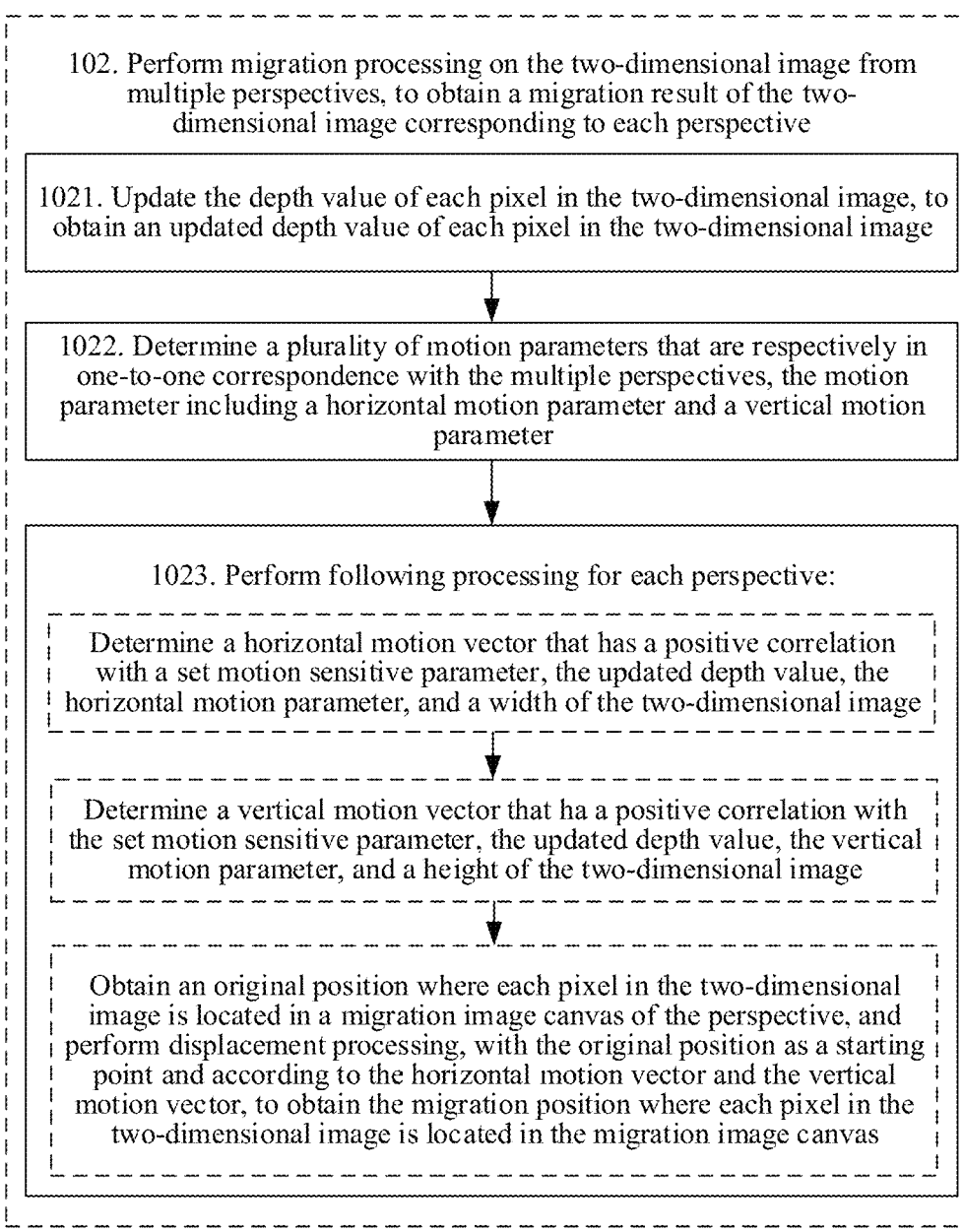

Based on FIG. 3A, referring to FIG. 3B, which is a schematic flowchart of a three-dimensionalization method for a two-dimensional image according to an embodiment of this application, the operation of performing migration processing on the two-dimensional image from multiple perspectives, to obtain a migration result of the two-dimensional image corresponding to each perspective in step 102 may be described by step 1021 to step 1023 as shown in FIG. 3B.

Step 1021. Update the depth value of each pixel in the two-dimensional image, to obtain an updated depth value of each pixel in the two-dimensional image.

As an example, the updated depth value is in a negative correlation with the inpainted depth value or the original depth value of the corresponding pixel. The depth value used for updating may be the original depth value or the depth value that has undergone the depth inpainting processing. The depth value used for updating is the inpainted depth value that has undergone the depth inpainting processing, when the depth inpainting solution is performed before step 102; and the depth value used for updating is the original depth value, in case that the depth inpainting solution is performed after step 102 and before step 103.

As an example, the updating processing may be calculating a reciprocal, and a new depth map is obtained after the updating processing, referring to formula (3):

$$D = (1/\text{Norm}(D)) - 0.5 \qquad (3);$$

Where Norm(D) is the regularization processing result of the pixel, D is the updated depth value, and the subtracted parameter is not limited to 0.5. The depth value obtained after the updating processing with reference to the above formula (3) is ranged between –0.5 and 0.5. A larger updated depth value characterizes a smaller visual distance, namely a closer distance of a pixel. The visual distance is used for characterizing a distance between a viewpoint and an object in an image. A visual distance of a long shot object is greater than a visual distance of a close-up shot object.

Step 1022. Determine a plurality of motion parameters that are respectively in one-to-one correspondence with the multiple perspectives.

As an example, the motion parameter includes a horizontal motion parameter and a vertical motion parameter.

In some embodiments, the process of determining the motion parameters may be that in which the motion parameters are indiscriminately obtained at intervals on a circle. Referring to FIG. 7, which is a schematic diagram of obtaining a motion parameter in a three-dimensionalization method for a two-dimensional image according to an embodiment of this application, (v, u) is used for representing the motion parameter, v being the vertical motion parameter, and u being the horizontal motion parameter. A point is acquired at every fixed angle on a circle with a radius of 1, and the ordinate and abscissa of the point are values of (v, u). A plurality of groups of (v, u) are obtained on the entire circle to be used for rendering a plurality of migration images of different perspectives. As such, in a case of performing different rendering styles of three-dimensionalization processing for the same image, migration images of the corresponding style may be obtained directly, and then be encapsulated in an order corresponding to the rendering style.

In some embodiments, the process of determining the motion parameters may be that in which the motion parameters are obtained in an individualized manner on the circle according to the perspectives corresponding to the rendering style, which, when compared with the implementation of indiscriminately obtaining the motion parameters, only needs to obtain the motion parameters of several perspectives, thereby only needing to perform image migration and rendering of several perspectives.

Step 1023. Perform following processing for each perspective: determining a horizontal motion vector that is in a positive correlation with a set motion sensitive parameter, the updated depth value, the horizontal motion parameter, and a width of the two-dimensional image; determining a vertical motion vector that is in a positive correlation with the set motion sensitive parameter, the updated depth value, the vertical motion parameter, and a height of the two-dimensional image; obtaining an original position where each pixel in the two-dimensional image is located in a migration image canvas of the perspective; performing displacement processing, with the original position as a starting point and according to the horizontal motion vector and the vertical motion vector, to obtain the migration position where each pixel in the two-dimensional image is located in the migration image canvas.

As an example, a specific approach of calculating the horizontal motion vector is as follows: multiplying the horizontal motion parameter u, the motion sensitive parameter scale, the updated depth value of the pixel, and the width w of the two-dimensional image, to obtain the horizontal motion vector. The pixel is moved horizontally in a negative direction, when the multiplication result is negative; and the pixel is moved horizontally in a positive direction, when the multiplication result is positive. A specific approach of calculating the vertical motion vector is as follows: multiplying the vertical motion parameter v, the motion sensitive parameter scale, the updated depth value of the pixel, and the height h of the two-dimensional image, to obtain the vertical motion vector. The pixel is moved vertically in a negative direction, when the multiplication result is negative; and the pixel is moved vertically in a positive direction, when the multiplication result is positive. For example, for the pixel (i, j) in the two-dimensional image, a horizontal migration position A refers to equation (4) and a vertical migration position B refers to equation (5):

$$A = i + u * \text{scale} * D(i,j) * w \quad (4);$$

$$B = j + v * \text{scale} * D(i,j) * h \quad (5);$$

Where the motion sensitive parameter scale is a preset constant, and the larger its value is, the larger a motion amplitude is; D (i, j) is the updated depth value of the updated depth map, with a value range between −0.5 and 0.5; U is the horizontal motion parameter; scale is the motion sensitive parameter; w is the width of the two-dimensional image; V is the vertical motion parameter; and h is the height of the two-dimensional image.

Through the above migration process, the following effect may be realized: front and back objects move in different directions, and an object that is closer or farther away from a viewpoint has a larger motion distance. Such motion mode satisfies a three-dimensional display rule. In view that the horizontal migration position and the vertical migration position are not integers, the implementation in step 103 may be used to contribute color components to neighboring positions.

Figure 3C:
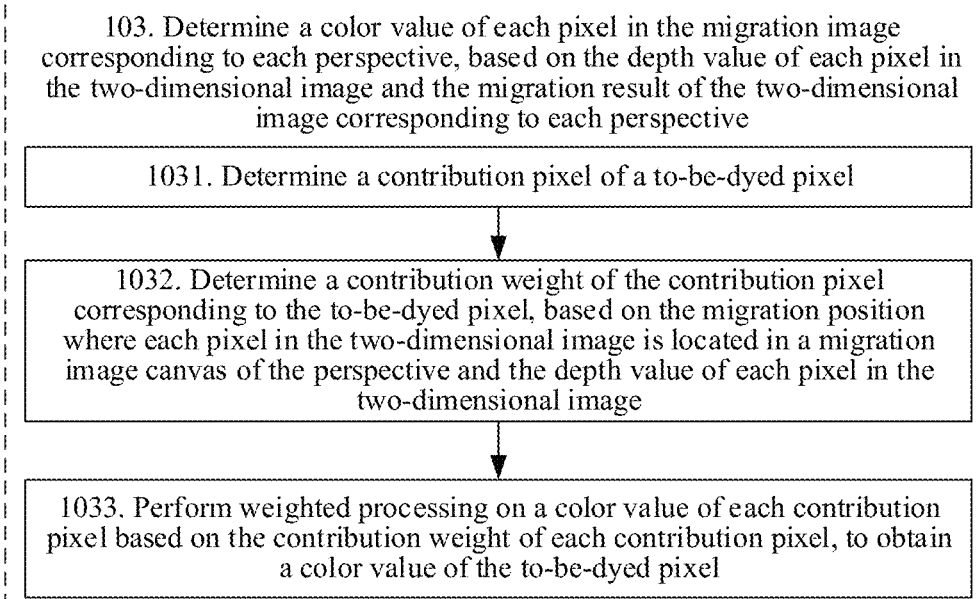

Based on FIG. 3A, referring to FIG. 3C, which is a schematic flowchart of a three-dimensionalization method for a two-dimensional image according to an embodiment of this application, the operation of determining a color value of each pixel in the migration image corresponding to each perspective, based on the depth value of each pixel in the two-dimensional image and the migration result of the two-dimensional image corresponding to each perspective in step 103 may be described by step 1031 to step 1033 as shown in FIG. 3C.

Each pixel in the migration image of each perspective is taken as the pixel that needs to be dyed, and following processing is performed on each pixel that needs to be dyed in the migration image canvas of each perspective:

Step 1031. Determine a contribution pixel of the pixel that needs to be dyed.

As an example, the contribution pixel is a pixel that is in the two-dimensional image and whose the migration position is located within a connected region of the pixel that needs to be dyed. The connected region refers to a collection of a plurality of pixels that have direct and indirect connectivity with the pixel that needs to be dyed. In some embodiments, the connected region may be a 3*3 square with the pixel that needs to be dyed as a center. The migration image obtained from the migration image canvas is constituted by pixels that need to be dyed. The migration result of each perspective obtained in step 102 includes: a migration position where each pixel in the two-dimensional image is migrated into the migration image canvas of the perspective, the migration image canvas having the same size as the two-dimensional image.

Figure 12:
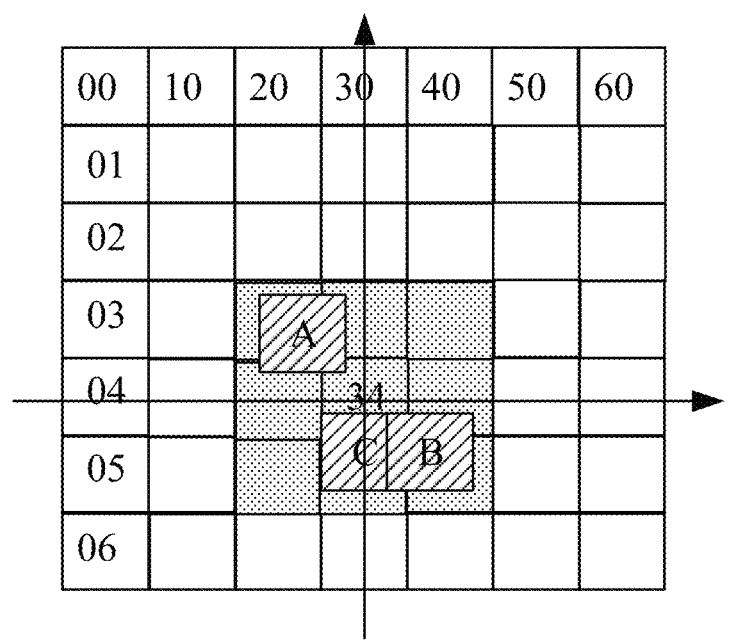
FIG. 12 is a schematic diagram showing a contribution principle of a three-dimensionalization method for a two-dimensional image according to an embodiment of this application.

As an example, referring to FIG. 12, it is a schematic diagram showing a contribution principle of a three-dimensionalization method for a two-dimensional image according to an embodiment of this application. For example, the migration image canvas includes 49 pixels that needs to be dyed. FIG. 12 also shows migration positions of three pixels A, B and C in the two-dimensional image in the migration image canvas after image migration. For the pixel that needs to be dyed 34, a region with a dot pattern is a connected region determined with the pixel that needs to be dyed 34 as a center. Since the three pixels A, B and C in the two-dimensional image are all located within the connected region, all of them in the two-dimensional image are contribution pixels of the pixel that needs to be dyed 34.

Step 1032. Determine a contribution weight of the contribution pixel corresponding to the pixel that needs to be dyed, based on the migration position where each pixel in the two-dimensional image is located in the migration image canvas of the perspective and the depth value of each pixel in the two-dimensional image.

In some embodiments, the operation of determining a contribution weight of the contribution pixel to the pixel that needs to be dyed, based on the migration position where each pixel in the two-dimensional image is located in the migration image canvas of the perspective and the depth value of each pixel in the two-dimensional image in step 1032 may be implemented by the following technical solution: when the contribution pixel is located at a bottom right region or a directly bottom region in the connected region of the pixel that needs to be dyed, performing rounding up processing on the migration result of the contribution pixel, to obtain the contribution weight that is in a positive correlation with an absolute difference between the migration result and a corresponding rounding up result, and the updated depth value of the contribution pixel; when the contribution pixel is located at a top left region or a directly top region in the connected region of the pixel that needs to be dyed, performing rounding down processing on the migration result of the contribution pixel, to obtain the contribution weight that is in a positive correlation with an absolute difference between the migration result and a corresponding rounding down result, and the updated depth value of the contribution pixel; when the contribution pixel is located at a top right region or a directly right region in the connected region of the pixel that needs to be dyed, performing the rounding up processing on a horizontal migration result of the contribution pixel, and performing the rounding down processing on a vertical migration result of the contribution pixel, to obtain the contribution weight that is in a positive correlation with an absolute difference between the migration result and a corresponding rounding result, and the updated depth value of the contribution pixel; and when the contribution pixel is located at a bottom left region or a directly left region in the connected region of the pixel that needs to be dyed, performing the rounding down processing on a migration result of the contribution pixel, and performing the rounding up processing on a vertical migration result of the contribution pixel, to obtain the contribution weight that is in a positive correlation with an absolute difference between the migration result and a corresponding rounding result, and the updated depth value of the contribution pixel.

As an example, referring to FIG. 12, the contribution pixel A and the contribution pixel B are at different relative distances from the pixel that needs to be dyed, and have different updated depth values. Therefore, the contribution pixel A and the contribution pixel B have different contribution weights for contributing color components to the pixel that needs to be dyed. The contribution pixel B is used as an example, and the contribution weight of the contribution pixel B to the pixel that needs to be dyed 34 may be a product of an absolute value of an abscissa difference and an absolute value of an ordinate difference from the contribution pixel B to the pixel that needs to be dyed 34. For example, the contribution weight of the contribution pixel B to the pixel that needs to be dyed 34 may be abs(i'-floor(i'))*abs(j'-floor(j')), where the floor(i') operation and the floor (j') operation are the rounding up operation. In the process of calculating the contribution pixel for the bottom right pixel that needs to be dyed, the rounding operation is the rounding down operation. Based on the calculated contribution weight, the contribution weight may be multiplied by exp(t*D(i, j)), to update the contribution weight (t may take a value of 10), where D(i, j) is the updated depth value of the contribution pixel. As such, the influence of the updated depth value of the contribution pixel in the two-dimensional image to the pixel that needs to be dyed is taken into account. After updating the depth value, a pixel with a closer visual distance has a larger D(i, j), so its contribution weight increases exponentially, which conforms to a motion rule in a three-dimensional visual effect.

As an example, when the contribution pixel is located at the bottom right region or the directly bottom region in the connected region of the pixel that needs to be dyed, for example, the contribution pixel B is located at the bottom right region in the connected region of the pixel that needs to be dyed, and the contribution pixel C is located at the directly bottom region in the connected region of the pixel that needs to be dyed, the rounding up processing is performed on the migration result (the horizontal migration position and the vertical migration position) of the contribution pixel, to obtain the contribution weight that is in a positive correlation with the absolute difference between the migration result and the corresponding rounding up result, and the updated depth value of the contribution pixel. The directly bottom region refers to that the migration position of the contribution pixel in the connected region is located directly below the pixel that needs to be dyed. The bottom right region refers to that the migration position of the contribution pixel in the connected region is in a fourth quadrant relative to the pixel that needs to be dyed.

As an example, when the contribution pixel is located at the top left region or the directly top region in the connected region of the pixel that needs to be dyed, for example, the contribution pixel A is located at the bottom right region in the connected region of the pixel that needs to be dyed, the rounding down processing is performed on the migration result (the horizontal migration position and the vertical migration position) of the contribution pixel, to obtain the contribution weight that is in a positive correlation with the absolute difference between the migration result and the corresponding rounding down result, and the updated depth value of the contribution pixel. The directly top region refers to that the migration position of the contribution pixel in the connected region is directly above the pixel that needs to be dyed. The top left region refers to that the migration position of the contribution pixel in the connected region is in a second quadrant relative to the pixel that needs to be dyed.

As an example, when the contribution pixel is located at the top right region or the directly right region in the connected region of the pixel that needs to be dyed, the rounding up processing is performed on the horizontal migration position of the contribution pixel, and the rounding down processing is performed on the vertical migration position of the contribution pixel, to obtain the contribution weight that is in a positive correlation with the absolute difference between the migration result and the corresponding rounding result, and the updated depth value of the contribution pixel. The directly right region refers to that the migration position of the contribution pixel in the connected region is on the directly right side of the pixel that needs to be dyed. The top right region refers to that the migration position of the contribution pixel in the connected region is in a first quadrant relative to the pixel that needs to be dyed.

As an example, if the contribution pixel is located at the bottom left region or the directly left region in the connected region of the pixel that needs to be dyed, the rounding down processing is performed on the migration result of the contribution pixel, and the rounding up processing is performed on the vertical migration result of the contribution pixel, to obtain the contribution weight that is in a positive correlation with the absolute difference between the migration result and the corresponding rounding result, and the updated depth value of the contribution pixel. The directly left region refers to that the migration position of the contribution pixel in the connected region is on the directly left side of the pixel that needs to be dyed. The bottom left region refers to that the migration position of the contribution pixel in the connected region is in a third quadrant relative to the pixel that needs to be dyed.

As an example, with a center of the pixel that needs to be dyed as an origin, vertical and horizontal coordinate axes are established in the manner as shown in FIG. 12, to obtain the above first to fourth quadrants.

Step 1033. Perform weighted processing on a color value of each contribution pixel based on the contribution weight of each contribution pixel, to obtain a color value of the pixel that needs to be dyed.

As an example, the contribution pixel A, the contribution pixel B, and the contribution pixel C respectively have contribution weights weightA, weightB, and weightC for the pixel that needs to be dyed. WeightA is multiplied with an RGB color value of the contribution pixel A in the two-dimensional image, weightB is multiplied with an RGB color value of the contribution pixel B in the two-dimensional image, and weightC is multiplied with an RGB color value of the contribution pixel C in the two-dimensional image. The multiplication results are summed and divided by a sum of weightA, weightB, and weightC, to obtain the color value of the pixel that needs to be dyed.

Step 104. Generate a migration image of the corresponding perspective, based on the color value of each pixel in the migration image of each perspective.

Step 105. Encapsulate the migration images of the multiple perspectives in an order, to obtain a three-dimensional video.

Figure 3D:
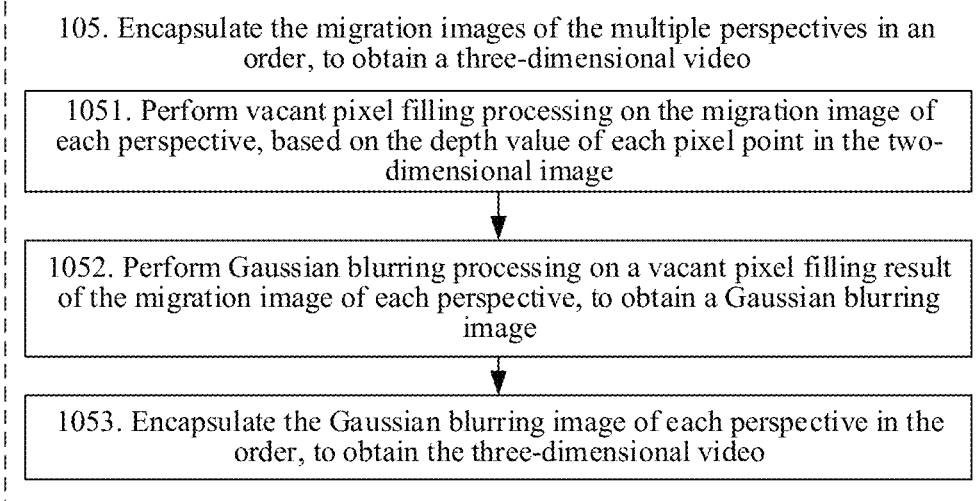

Based on FIG. 3A, referring to FIG. 3D, which is a schematic flowchart of a three-dimensionalization method for a two-dimensional image according to an embodiment of this application, the operation of encapsulating the migration images of multiple perspectives in an order, to obtain a three-dimensional video in step 105 may be described by step 1051 to step 1053 as shown in FIG. 3D.

Step 1051. Perform vacant pixel filling processing on the migration image of each perspective, based on the depth value of each pixel in the two-dimensional image.

In some embodiments, the operation of performing vacant pixel filling processing on the migration image of each perspective, based on the depth value of each pixel in the two-dimensional image in step 1051 may be implemented by the following technical solution: performing following processing for each pixel that needs to be dyed in the migration image of each perspective: determining a position of the pixel that needs to be dyed as a vacant position, when there is no contribution pixel corresponding to the pixel that needs to be dyed in a connected region of the pixel that needs to be dyed; and performing following processing for each vacant position in the migration image: querying a reference pixel of the pixel that needs to be dyed in the connected region of the vacant position, with the vacant position as a center and based on the depth values of some pixels in the two-dimensional image; and performing color value filling processing on the pixel that needs to be dyed, based on the color value of the reference pixel.

As an example, referring to FIG. 12, there is no contribution pixel in the connected region of the pixel that needs to be dyed 00 in FIG. 12, so the pixel that needs to be dyed 00 in the obtained migration image is empty. The position of the pixel that needs to be dyed is determined as the vacant position, and the filling processing needs to be performed on the pixel that needs to be dyed 00. Accordingly, the reference pixel corresponding to the pixel that needs to be dyed 00 needs to be determined to fill the color value of the reference pixel in the migration image in the vacant position of the pixel that needs to be dyed 00.

In some embodiments, the operation of querying a reference pixel of the pixel that needs to be dyed in a connected region of the vacant position, with the vacant position as a center and based on the depth values of some pixels in the two-dimensional image may be implemented by the following technical solution: determining a plurality of sets of query directions with the vacant position as a starting point, each set of query directions including a first direction and a second direction that are opposite to each other; performing following processing for each set of query directions: determining a pixel of a non-vacant position closest to the vacant position in the first direction within the connected region of the vacant position, and determining a pixel of a non-vacant position closest to the vacant position in the second direction within the connected region of the vacant position; determining a pixel distance between the pixel determined in the first direction and the pixel determined in the second direction; determining two pixels corresponding to a minimum pixel distance in the plurality of sets of query directions; and determining rendering depth values of the two pixels based on the depth values of the some pixels in the two-dimensional image, and determining a pixel with a larger rendering depth value as the reference pixel of pixel that needs to be dyed.

Figure 9:
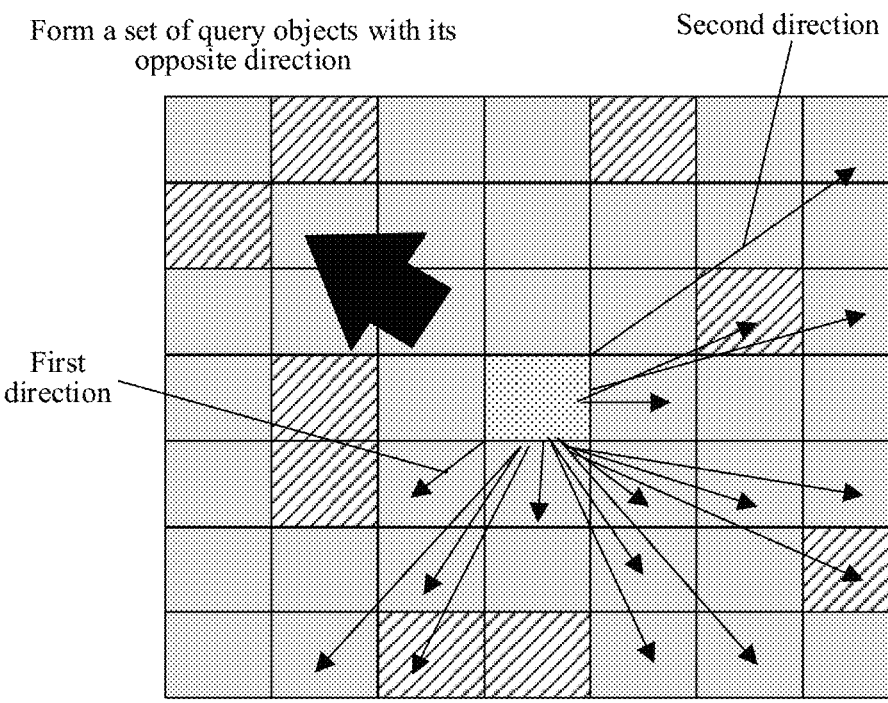
FIG. 9 is a schematic query diagram of a three-dimensionalization method for a two-dimensional image according to an embodiment of this application.

As an example, referring to FIG. 9, it is assumed that the middle pixel with the dot pattern in FIG. 9 is the pixel that needs to be dyed that needs to undergo the filling processing, and its position is the vacant position. The plurality of sets of query directions with the vacant position as the starting point may be obtained according to a fixed angle. It is assumed that there are two sets of query directions. The first direction and the second direction included in a first set of query directions are opposite to each other, and the first direction and the second direction included in a second set of query directions are opposite to each other. In addition, there is an angle between a straight line where the first set of query directions is located and a straight line where the second set of query directions is located. The first direction and the second direction shown in FIG. 9 are used as an example. With the vacant position as the starting point, the pixels (the pixels with a stripe pattern) of the non-vacant positions closest to the vacant position are determined in the first direction within the connected region of the vacant position, and the pixels (the pixels with the stripe pattern) of the non-vacant positions closest to the vacant position are determined in the second direction within the connected region of the vacant position. The pixels determined herein are pixels that form the migration image. The connected region herein may be at most within the image range, that is, the entire migration image is used as the connected region, or a region with a limited range is specified as the connected region. The pixel distance between the pixels of the non-vacant positions determined in the first direction and the second direction is determined to obtain a first pixel distance in the first set of query directions and a second pixel distance in the second set of query directions. For the two pixels (the pixels of the non-vacant positions, namely the pixels with the stripe pattern) corresponding to the minimum pixel distance in the first pixel distance and the second pixel distance, the rendering depth values of the two pixels are determined based on the depth values of the some pixels in the two-dimensional image, and the pixel with a larger rendering depth value is determined as the reference pixel of the pixel that needs to be dyed, so that the background pixel (the pixel with a larger depth value) close to the vacant position may be used to fill the vacant position.

In some embodiments, the migration result of each perspective includes: a migration position where each pixel in the two-dimensional image is migrated into a migration image canvas of each perspective, the migration image canvas having the same size as the two-dimensional image, and some pixels being contribution pixels of a target pixel. The operation of determining rendering depth values of the two pixels based on the depth values of the some pixels in the two-dimensional image may be performed by the following technical solution: using any one of the two pixels as the target pixel, and performing following processing: determining contribution pixels of the target pixel, the contribution pixels being pixels that are in the two-dimensional image and whose migration positions are located in a connected region of the target pixel; determining contribution weights of the contribution pixels to the target pixel, based on the migration positions of the contribution pixels in the migration image canvas of the perspective; and performing weighted processing on the depth values of the contribution pixels based on the contribution weights of the contribution pixels, to obtain the rendering depth values of the two pixels.

As an example, the rendering depth values of the two pixels corresponding to the minimum pixel distance in the migration image are obtained in a similar way as the color value of the pixel that needs to be dyed in step 103. A difference only lies in that the components for weighted sum are the depth values of the contribution pixels instead of RGB color values. The two pixels are respectively used as the target pixel, to obtain the rendering depth values, thereby obtaining the rendering depth values of the two pixels. That is, the weighted sum processing is performed twice. Alternatively, the process of performing the color value filling processing may be implemented using a model that has undergone deep learning.

Step 1052. Perform Gaussian blurring processing on a vacant pixel filling result of the migration image of each perspective, to obtain a Gaussian blurring image.

As an example, the Gaussian blurring processing may be understood as setting an average of neighboring pixels to a color value of a target pixel of Gaussian blurring. The target pixel of Gaussian blurring is used as a central point, and the average of the color values of the neighboring points (points closely surrounding the central point) is used as the color value of the central point. This is a smoothing processing numerically, which is equivalent to producing a blurring effect on a graph. The central point as the target pixel loses detail, and the target pixel of Gaussian blurring is a pixel that has undergone the color value filling processing.

Step 1053. Encapsulate the Gaussian blurring image of each perspective in an order, to obtain a three-dimensional video.

Figure 11:
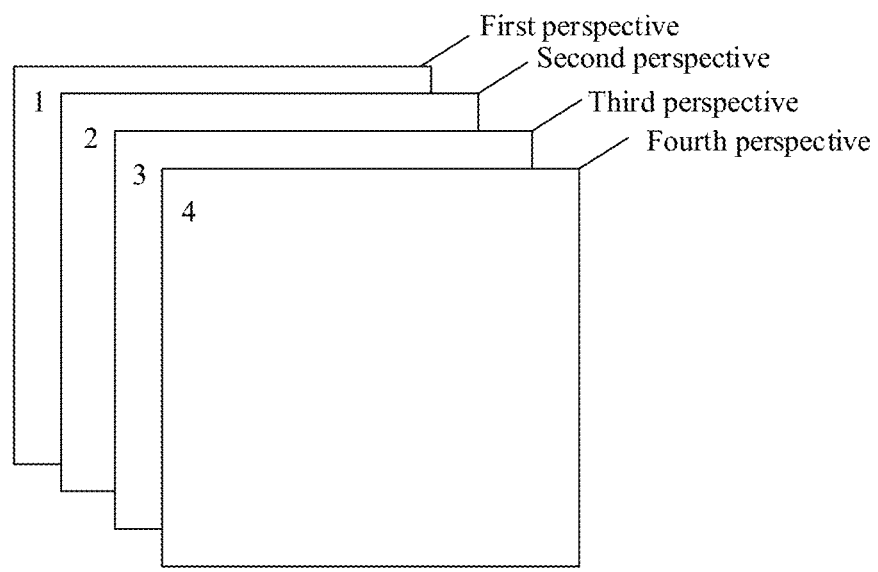
FIG. 11 is a schematic encapsulation diagram of a three-dimensionalization method for a two-dimensional image according to an embodiment of this application.

As an example, referring to FIG. 11, it is a schematic encapsulation diagram of a three-dimensionalization method for a two-dimensional image according to an embodiment of this application. In response to a rendering style specified in the three-dimensionalization operation, an encapsulation order of the Gaussian blurring image of each perspective is determined. If the Gaussian blurring processing is not performed, an encapsulation order of the migration image of each perspective that has undergone the color value filling processing is determined. In a scene having a low requirement for image quality, the migration image of each perspective may be directly encapsulated, that is, the encapsulation order of the migration image of each perspective is determined, that is, the encapsulation order essentially corresponds to the perspectives. When the perspectives corresponding to the rendering style specified in the three-dimensionalization operation are a first perspective, a second perspective, a third perspective and a fourth perspective, new images of the first perspective, the second perspective, the third perspective and the fourth perspective are encapsulated in the encapsulation order of these corresponding perspectives specified by the rendering style, to obtain a three-dimensional video with the corresponding rendering style.

Figure 3E:
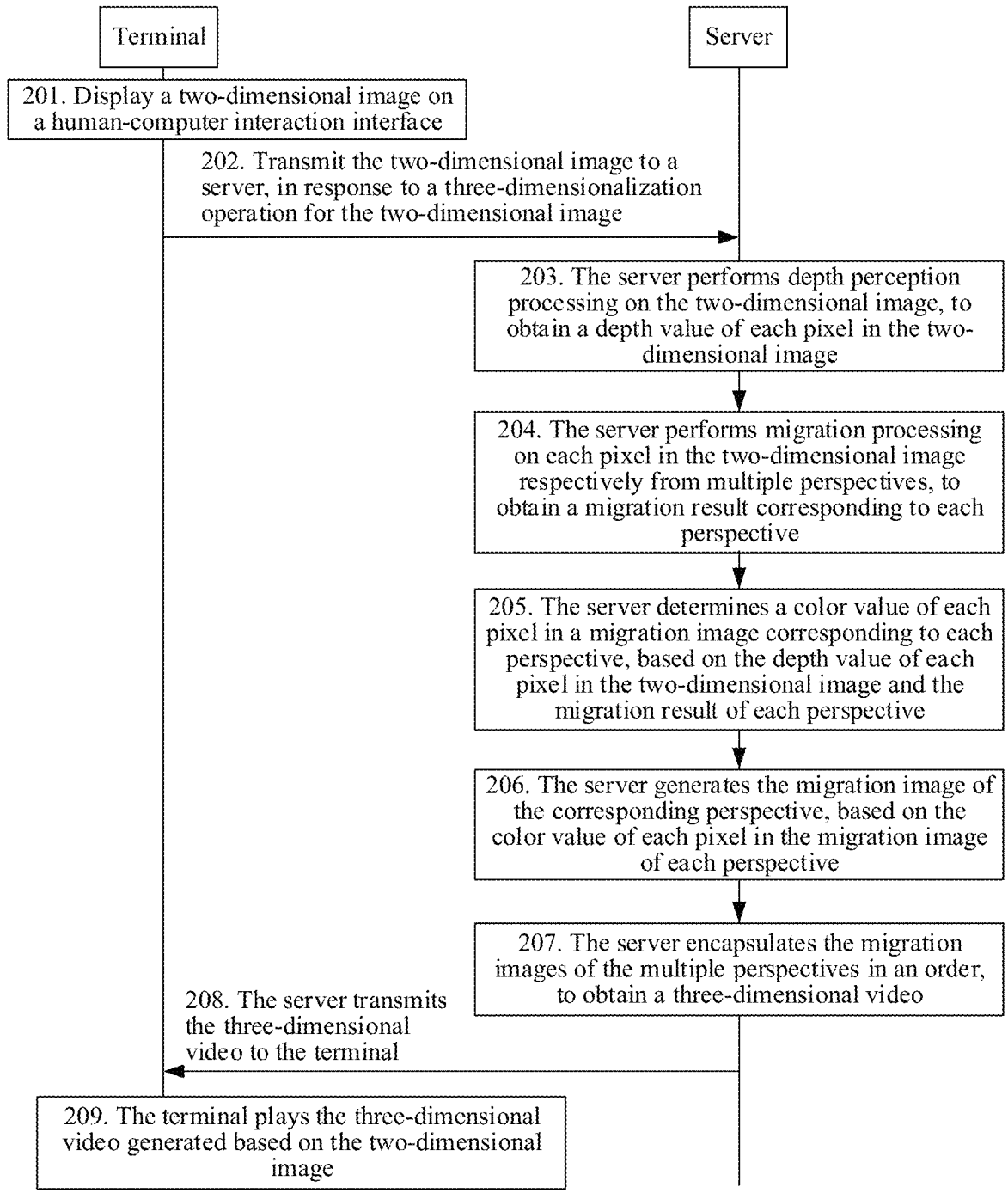

Referring to FIG. 3E, which is a schematic flowchart of a three-dimensionalization method for a two-dimensional image according to an embodiment of this application, the description is made with reference to step 201 to step 209 as shown in FIG. 3E. In step 201, a two-dimensional image is displayed on a human-computer interaction interface. In step 202, the two-dimensional image is transmitted to a server, in response to a three-dimensionalization operation for the two-dimensional image. In step 203, the server performs depth perception processing on the two-dimensional image, to obtain a depth value of each pixel in the two-dimensional image. In step 204, the server performs migration processing on each pixel in the two-dimensional image respectively from multiple perspectives, to obtain a migration result corresponding to each perspective. In step 205, the server determines a color value of each pixel in a migration image corresponding to each perspective, based on the depth value of each pixel in the two-dimensional image and the migration result of each perspective. In step 206, the server generates the migration image of the corresponding perspective, based on the color value of each pixel in the migration image of each perspective. In step 207, the server encapsulates the migration images of the multiple perspectives in an order, to obtain a three-dimensional video. In step 208, the server transmits the three-dimensional video to the terminal. In step 209, the terminal plays the three-dimensional video generated based on the two-dimensional image.

In the following, an application of the three-dimensionalization method for a two-dimensional image provided by the embodiments of this application is described.

An electronic photo album client receives a user's selection operation for a photo, and displays a target photo of the selection operation as a to-be-processed image. In response to a three-dimensionalization operation for the to-be-processed image, the electronic photo album client calls the three-dimensionalization method for a two-dimensional image provided by the embodiments of this application to generate a preview of a three-dimensional video of the to-be-processed image. In response to a user's adjustment operation for the three-dimensional video, the electronic photo album client adjusts an encapsulation order of images of multiple perspectives according to an adjustment approach specified in the adjustment operation. For example, the encapsulation order is adjusted to that the visual effect is from close-up shot to long shot or from long shot to close-up shot.

After predicting scene depth information by a deep learning model, the three-dimensionalization method for a two-dimensional image provided by the embodiments of this application uses an image processor to perform transformation processing at the two-dimensional image level using a unified electronic device architecture algorithm, and after the transformation processing, perform filling processing and blurring processing to quickly obtain images of new perspectives to realize synthesis of multiple three-dimensional perspectives based on depths. The processing process of performing three-dimensional transformation based on the two-dimensional image includes depth map prediction processing, three-dimensional scene re-rendering, vacancy filling and blurring. The entire process may be performed in parallel on an image processor of a graphics card, which is fast. Besides, an excellent three-dimensional video effect can be obtained without performing three-dimensional modeling processing under the premise of avoiding the three-dimensional scene modeling in related art, thereby satisfying requirements that the terminal obtain the three-dimensional video by the two-dimensional image. In addition, since the re-rendering approach and the filling approach are both based on the initial depth estimation result, the rendering processing and the filling processing conform to scene rules.

The terminal uploads the to-be-processed image to a backend, to allow the backend to call the three-dimensionalization method for a two-dimensional image provided by the embodiments of this application to perform the three-dimensionalization processing on the to-be-processed image to obtain a three-dimensional video, and then transmit the three-dimensional video back to the terminal for display and playing. By performing the depth estimation processing, the depth edge inpainting processing, determining images of multiple perspectives based on depths, and performing vacancy filling and blurring processing, etc., the three-dimensionalization method for a two-dimensional image provided by the embodiments of this application generates two-dimensional images of multiple perspectives of the same scene based on an inputted two-dimensional image, to form a three-dimensional video.

Figure 4:
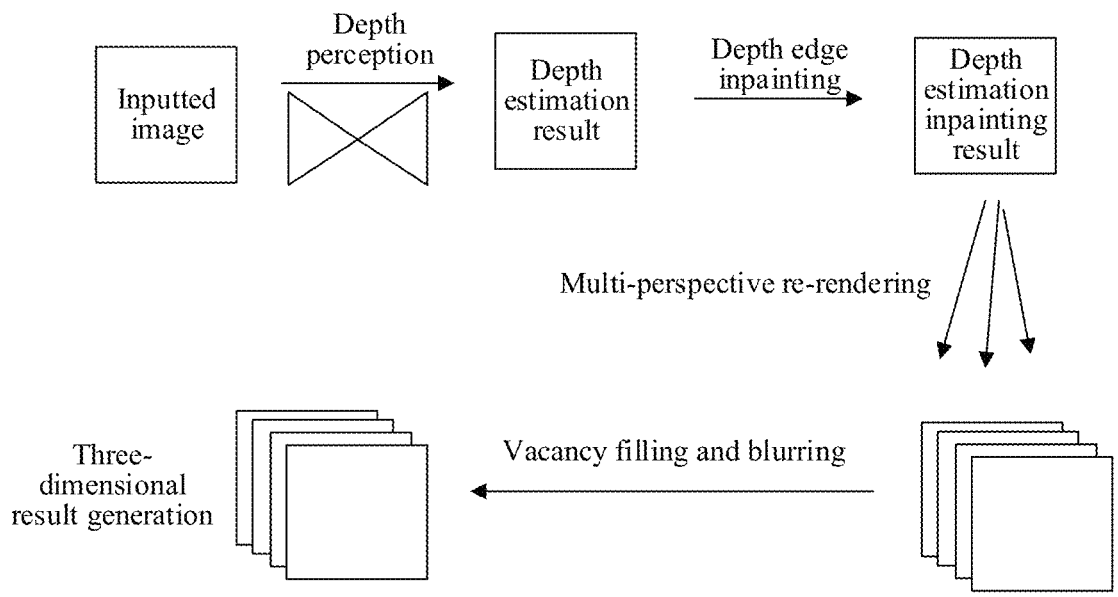
FIG. 4 is a schematic flowchart of a three-dimensionalization method for a two-dimensional image according to an embodiment of this application.

Referring to FIG. 4, which is a schematic flowchart of a three-dimensionalization method for a two-dimensional image according to an embodiment of this application, the processing flow includes a depth perception process, a depth edge inpainting process, a multi-perspective re-rendering process, a vacancy filling and blurring process, and a three-dimensional video result generation process. During the depth perception process, depth perception is performed on an inputted image, to obtain a predicted depth map. Depth edge inpainting processing is performed on an obtained depth estimation result. Three-dimensional scene re-rendering is performed based on a depth estimation inpainting result, and vacancy filling and blurring processing is performed based on a multi-perspective re-rendering result, to generate a three-dimensional video result based on a vacancy filling and blurring processing result. The entire processes may be performed in parallel on an image processor and a graphics card, thus a processing speed is fast. Through the above processes, an excellent three-dimensional video effect can be obtained without performing three-dimensional modeling processing, thereby satisfying requirements that the terminal obtains the three-dimensional video based on the two-dimensional image. The re-rendering approach and the filling approach are both based on the initial depth estimation result, so that the rendering processing and the filling processing conform to scene rules.

During the depth perception process, the depth estimation processing is performed on an inputted image I using a deep learning model F, to obtain the depth estimation result D having the same resolution as the inputted image I, namely D=F(I). Each pixel value in the depth estimation result (depth map D) represents a depth of a pixel in the inputted image. For the obtained depth map, a larger depth characterizes a farther distance of a pixel. Referring to FIG. 5, it is a depth map of a three-dimensionalization method for a two-dimensional image according to an embodiment of this application. The depth estimation result obtained in the depth perception process produces uneven continuous jumps at edges. Each grid in FIG. 5 represents a pixel. A background object is black grids, and a foreground object is white grids. Theoretically, there is no gray grid therebetween, which is in line with the principle that the same object has the same depth. However, there is a discontinuous jump phenomenon in FIG. 5, namely step jumps that the black grids are adjacent to the gray grids, and the gray grids are adjacent to the white grids, which results in different depth estimation results of the same object.

Therefore, during the depth edge inpainting process, the edge depths are improved via fast median replacement. First, the regularization processing is performed on the depth map obtained in the depth perception process, to reduce the value range of the depth map to the interval of 0 to 1, namely Norm(D)=(D−D.min)/(D.max−D.min), D.max referring to a maximum depth value of all the pixels in the depth map, and Dmin referring to a minimum depth value of all the pixels in the depth map. For each pixel in the depth map, the absolute differences between the depth value of each pixel in the depth map and the depth values of four adjacent pixels on the top, bottom, left and right sides of this pixel are calculated, to determine whether this pixel is within the edge region. Referring to FIG. 6, it is an edge marking map of a three-dimensionalization method for a two-dimensional image according to an embodiment of this application. If all the absolute differences (the above four absolute values) are less than the difference threshold, for example, the difference threshold is set to 0.04, this pixel is marked as 1, and discriminated as the edge pixel. For example, it is assumed that a regularized depth of this point is D (i, j), i denoting a horizontal position of this point, and j denoting a vertical position of this point. If max(abs(D(i, j)−D(i+1, j)), abs(D(i, j)−D(i−1, j)), abs(D(i, j)−D(i, j+1)), abs(D(i, j)−D(i, j−1))) <difference threshold, this pixel is marked as 1, and discriminated as the edge pixel; otherwise, this pixel is marked as 0, and discriminated as the non-edge pixel.

In the edge marking map, a square of size k*k is taken with each pixel as a center, which is used for performing the median replacement on the depth value of the central pixel. If there is a point with a value of 1 in the square, the central point needs to undergo the median replacement processing; otherwise, there is no need to perform the median replacement processing. One processing approach is to obtain depth values of all non-edge pixels (namely points with the value of 0 in the edge marking map) from the depth map (k*k depth map) in which there is a point with a value of 1, arrange these depth values from smallest to largest, and use a median after the arrangement to replace the depth value of the central pixel. After processing all the pixels in the depth map, the median replacement edge processing for the depth map is completed. For the obtained depth map, a greater depth characterizes a farther distance of a pixel.

During the process of multi-perspective rendering, re-rendering is performed on an original color image from multiple perspectives, based on the depth map that has undergone depth edge inpainting. First, the depth map that has undergo depth edge inpainting is updated again, to obtain a new depth map D=(1/Norm(D))−0.5, where Norm (D) is the regularization processing, Norm(D)=(D−Dmin)/(D.max−D.min). This operation makes all the depth values ranged between −0.5 and 0.5. A larger new depth value characterizes a smaller visual distance, namely a closer distance of a pixel.

Figure 8:
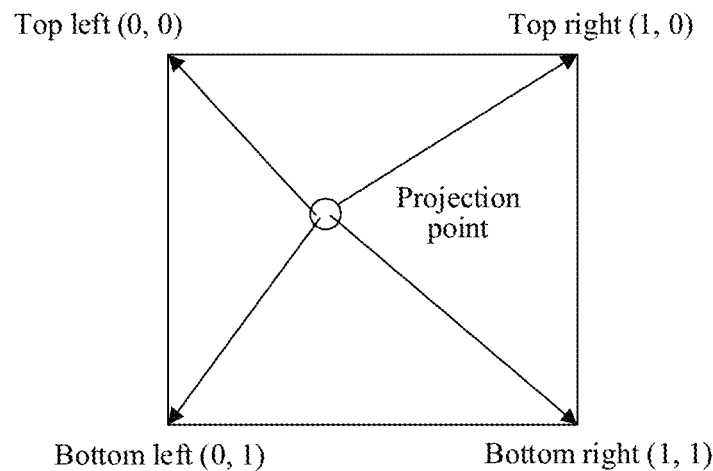
FIG. 8 is a schematic contribution diagram of a three-dimensionalization method for a two-dimensional image according to an embodiment of this application.

It is assumed that a size of the original color map A is h*w, and motion parameters v and u are respectively set in the vertical direction and the horizontal direction. Referring to FIG. 7, it is a schematic diagram of obtaining a motion parameter of a three-dimensionalization method for a two-dimensional image according to an embodiment of this application. For a combination of (v, u), a point is obtained at every fixed angle on a circle with a radius of 1, and the ordinate and abscissa of this point are values of (v, u). A plurality of groups (v, u) obtained on the entire circle may be used for rendering new images of multiple different perspectives. Based on the depth map D that has undergone the edge inpainting processing, each pixel A (i, j) in the original color map moves to a target position A (i+u*scale*D (i, j)*w, j+v*scale*D(i, j)*h), where scale is a constant, and the larger its value is, the larger a motion amplitude is. The depth values of the depth map are ranged between −0.5 and 0.5. This satisfies that the front and back objects move in different directions, and an object that is closer or farther away from a viewpoint has a larger motion distance. Such motion mode satisfies the three-dimensional display rule. In view that the target position i'=i+u*scale*D(i, j)*w; j'=j+v*scale*D(i, j)*h is not integers, a splatting approach is used to contribute color components to neighboring points. Referring to FIG. 8, it is a schematic contribution diagram of a three-dimensionalization method for a two-dimensional image according to an embodiment of this application. A projection point on an edge refers to, for example, a projection point on an edge formed by (0,0) and (0,1), and this projection point affects the color values of the (0,0) position and the (0,1) position. A projection point (i', j') shown in FIG. 8 is located among four pixel positions, and contribution weights of this projection point to the four pixels is products of absolute values of abscissa differences and absolute values of ordinate differences from this projection point to the corresponding four pixels. Herein, the top left (LeftUp) and the bottom right (RightDown) correspond to each other, and the top right (RightUp) and the bottom left (LeftDown) correspond to each other. For example, the contribution weight of the projection point to the top left is w=abs(i'−floor(i'))*abs(j'−floor(j')), where the floor operation is the rounding up operation. In a case of calculating the contribution weight to the bottom right, the rounding operation is the rounding down operation. Since a plurality of pixels in the original color map A after movement may contribute color components to the same point in the canvas of a new perspective, based on the influence of depth, for a pixel that needs to be dyed at a certain position in the canvas of the new perspective, a pixel close to the background has much less contribution to this pixel that needs to be dyed than other pixels to this pixel that needs to be dyed. The contribution weights w of this position (i', j') that is in the re-rendering image A' and corresponds to the pixel (i, j) in the original color map A to the four neighboring pixels are multiplied by exp(t*D(i, j)), where t may take a value of 10. After the updating, a closer pixel has a larger D(i, j), so its contribution value increases exponentially. During the color rendering process, all the pixels in the original color image A are moved based on (v, u), and contribute GRB color components to the pixels that need to be dyed in the new rendering image A' by weights. The color components and the weights are respectively multiplied and accumulated, and a cumulative color component is divided by a cumulative weight component to obtain the color value of the pixel that needs to be dyed, which avoids excessive color component contribution. The depth rendering is performed at the same time as the color rendering. The depth rendering is performed on the depth map that has undergone the edge inpainting processing in a similar way as the above process, to obtain new depth maps rendered from multiple perspectives. The new depth maps rendered from the multiple perspectives still satisfy the rule that the farther the distance (long shot) is, the greater the depth value is.

Figure 10:
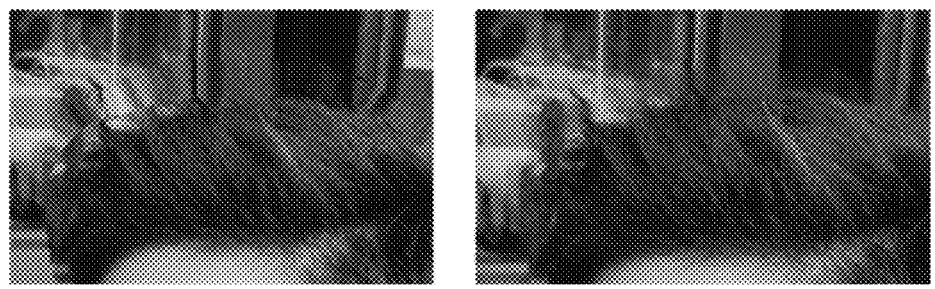
FIG. 10 is a schematic effect diagram of a three-dimensionalization method for a two-dimensional image according to an embodiment of this application.

During the process of vacancy filling and blurring processing, due to occlusion, for some positions in the images of multiple perspectives obtained through color rendering, there are no original image pixels around these positions to contribute color components to them, and accordingly, these positions are regarded as vacant positions that need to be filled. The following processing is performed on any of these vacant positions. Referring to FIG. 9, it is a schematic query diagram of a three-dimensionalization method for a two-dimensional image according to an embodiment of this application. A plurality of different forward directions (first directions) are obtained with the vacant position as a starting point, and these forward directions together with their opposite directions (second directions) based on this point form a plurality of sets of query objects. For each set of query objects, pixels that are nearest and not vacant are searched in the two directions. If the search is failed within the image range, this set of query objects is discarded. For sets of query objects that have searched target pixels in the two directions, one set of query objects that has a shortest pixel distance between the two pixels in the two directions is selected. In addition, based on the depth values obtained in the depth rendering process, the pixel with a larger depth value (the pixel with a larger depth value in the two opposite directions) at the corresponding positions (the pixel in the first direction and the pixel in the second direction) is selected, and the RGB color values of this pixel is used to fill this vacant position. The principle on which the filling processing is based is to use a background pixel that is close to the target pixel (the vacant position) to fill it. For any of the pixels after the filling processing, the Gaussian blurring processing is performed on this point using its neighboring pixels, to avoid high repetition between this pixel after the vacancy filling processing and its neighboring pixels, thereby improving the visual effect. Referring to FIG. 10, which is a schematic effect diagram of a three-dimensionalization method for a two-dimensional image according to an embodiment of this application, a boundary in the left figure is apparent, while in the right figure obtained after Gaussian blurring processing, a visual effect of pixels after vacancy filling and its neighboring pixels is less sharp. The above operations may be operated on an image processor, which has a fast speed and a low latency. All the images rendered from the new perspectives are combined into a video, thereby obtaining a three-dimensional video result.

According to the three-dimensionalization method for a two-dimensional image provided by the embodiments of this application, different perspectives of a scene may be reasonably reconstructed at the two-dimensional image level and based on the depth estimation result. Compared with other three-dimensional modeling methods, this method reduces processing time, thereby facilitating a mobile terminal to quickly obtain and display the generated video result.

In the following, a structure of a the three-dimensionalization apparatus 455 for a two-dimensional image that is provided by the embodiments of this application and implemented as software modules is described. In some embodiments, as shown in FIG. 2, the software modules of the three-dimensionalization apparatus 455 for a two-dimensional image stored in the memory 450 may include: a depth module 4551, configured to perform depth perception processing on a two-dimensional image, to obtain a depth value of each pixel in the two-dimensional image; a migration module 4552, configured to perform migration processing on the two-dimensional image from multiple perspectives, to obtain a migration result of the two-dimensional image corresponding to each perspective; a color determining module 4553, configured to determine a color value of each pixel in a migration image corresponding to each perspective, based on the depth value of each pixel in the two-dimensional image and the migration result of the two-dimensional image corresponding to each perspective; a generation module 4554, configured to generate, based on the color value of each pixel in the migration image of each perspective, the migration image corresponding to the perspective; and an encapsulation module 4555, configured to encapsulate the migration images of the multiple perspectives in an order, to obtain a three-dimensional video.

In some embodiments, the migration module 4552 is configured to, before the determining of the color value of each pixel in the migration image corresponding to each perspective, based on the depth value of each pixel in the two-dimensional image and the migration result of the two-dimensional image corresponding to each perspective: use the depth value of each pixel in the two-dimensional image obtained through the depth perception processing as an original depth value; perform depth inpainting processing on the original depth value of each pixel in the two-dimensional image, to obtain an inpainted depth value of each pixel in the two-dimensional image; and replace the corresponding original depth value based on the inpainted depth value of each pixel.

In some embodiments, the migration module 4552 is configured to: determine edge pixels in the two-dimensional image and non-edge pixels in the two-dimensional image, based on the original depth value of each pixel in the two-dimensional image; determine a pixel that needs to be replaced in the two-dimensional image that needs to undergo median replacement and a retained pixel in the two-dimensional image that does not need to undergo median replacement, based on the edge pixels; sort the original depth values of all non-edge pixels in a connected region of the pixel that needs to be replaced in descending order, and using a median of a sort result in the descending order as the inpainted depth value of the pixel that needs to be replaced; and retain the original depth value of the retained pixel as the inpainted depth value of the retained pixel.

In some embodiments, the migration module 4552 is configured to: perform following processing for any one pixel in the two-dimensional image: determine the pixel as the non-edge pixel, when an absolute difference between a regularization processing result of the original depth value of the pixel and a regularization processing result of the original depth value of at least one adjacent pixel is not less than a difference threshold, the adjacent pixel being a pixel located at an adjacent position of the any one pixel; and determine the pixel as the edge pixel, when the absolute difference between the regularization processing result of the original depth value of the pixel and the regularization processing result of the original depth value of each adjacent pixel is less than the difference threshold.

In some embodiments, the migration module 4552 is configured to: perform following processing for any one pixel in the two-dimensional image: determine the pixel as the pixel that needs to be replaced, when there is at least one edge pixel in a connected region of the pixel; and determine the pixel as the retained pixel, when there is no edge pixel in the connected region of the pixel.

In some embodiments, the migration module 4552 is configured to: update the depth value of each pixel in the two-dimensional image, to obtain an updated depth value of each pixel in the two-dimensional image, the updated depth value being in a negative correlation with an inpainted depth value of the corresponding pixel; determine a plurality of motion parameters that are respectively in a one-to-one correspondence with the multiple perspectives, the motion parameter including a horizontal motion parameter and a vertical motion parameter; perform following processing for each perspective: determine a horizontal motion vector that is in a positive correlation with a set motion sensitive parameter, the updated depth value, the horizontal motion parameter, and a width of the two-dimensional image; determine a vertical motion vector that is in a positive correlation with the set motion sensitive parameter, the updated depth value, the vertical motion parameter, and a height of the two-dimensional image; and perform displacement processing at an original position that is in a migration image canvas of the perspective and corresponds to each pixel in the two-dimensional image, according to the horizontal motion vector and the vertical motion vector, to obtain a migration position of each pixel in the migration image canvas.

In some embodiments, the migration result of each perspective includes: a migration position where each pixel in the two-dimensional image is migrated into a migration image canvas of the perspective, the migration image canvas having a same size as the two-dimensional image. The color determining module 4553 is configured to: use each pixel in the migration image of each perspective as a pixel that needs to be dyed, and perform following processing on each pixel that needs to be dyed in the migration image canvas of each perspective: determine a contribution pixel of the pixel that needs to be dyed, the contribution pixel being a pixel that is in the two-dimensional image and whose migration position is located in a connected region of the pixel that needs to be dyed; determine a contribution weight of the contribution pixel corresponding to the pixel that needs to be dyed, based on the migration position where each pixel in the two-dimensional image is located in the migration image canvas of the perspective, and the depth value of each pixel in the two-dimensional image; and perform weighted processing on a color value of each contribution pixel based on the contribution weight of each contribution pixel, to obtain the color value of the pixel that needs to be dyed.

In some embodiments, the encapsulation module 4555 is configured to: perform vacant pixel filling processing on the migration image of each perspective, based on the depth value of each pixel in the two-dimensional image; perform Gaussian blurring processing on a vacant pixel filling result of the migration image of each perspective, to obtain a Gaussian blurring image; and encapsulate the Gaussian blurring image of each perspective in the order, to obtain the three-dimensional video.

In some embodiments, the encapsulation module 4555 is configured to: perform following processing for each pixel that needs to be dyed in the migration image of each perspective: determine a position of the pixel that needs to be dyed as a vacant position, when there is no contribution pixel corresponding to the pixel that needs to be dyed in a connected region of the pixel that needs to be dyed; perform following processing for each vacant position in the migration image: query a reference pixel of the pixel that needs to be dyed in the connected region of the vacant position, with the vacant position as a center, and based on the depth values of some pixels in the two-dimensional image; and perform color value filling processing on the pixel that needs to be dyed, based on the color value of the reference pixel.

In some embodiments, the encapsulation module 4555 is configured to: determine a plurality of sets of query directions with the vacant position as a starting, each set of query directions including a first direction and a second direction that are opposite to each other; perform following processing for each set of query directions: determine a pixel of a non-vacant position closest to the vacant position in the first direction within the connected region of the vacant position, and determine a pixel of a non-vacant position closest to the vacant position in the second direction within the connected region of the vacant position; determine a pixel distance between the pixel determined in the first direction and the pixel determined in the second direction; determine two pixels corresponding to a minimum pixel distance in the plurality of sets of query directions; and determine rendering depth values of the two pixels based on the depth values of the some pixels in the two-dimensional image, and determining a pixel with a larger rendering depth value as the reference pixel of the pixel that needs to be dyed.

In some embodiments, the migration result of each perspective includes: a migration position where each pixel in the two-dimensional image is migrated into a migration image canvas of the perspective, the migration image canvas having a same size as the two-dimensional image. The some pixels are contribution pixels of a target pixel. The encapsulation module 4555 is configured to: use any one of the two pixels as the target pixel, and perform following processing: determine the contribution pixels of the target pixel, the contribution pixels being pixels that are in the two-dimensional image and whose migration positions are located in a connected region of the target pixel; determine contribution weights of the contribution pixels to the target pixel, based on the migration positions of the contribution pixels in the migration image canvas of the perspective; and perform weighted processing on the depth values of the contribution pixels based on the contribution weights of the contribution pixels, to obtain the rendering depth values of the two pixels.

An embodiment of this application provides a computer program product or a computer program. The computer program product or the computer program includes computer instructions, and the computer instructions are stored in a computer-readable storage medium. A processor of an electronic device reads the computer instructions from the computer-readable storage medium, and executes the computer instructions, to cause the electronic device to perform the three-dimensionalization method for a two-dimensional image according to any of the foregoing embodiments of this application.

An embodiment of this application provides a computer-readable storage medium, storing executable instructions. The executable instructions, when being executed by a processor, cause the processor to perform the method provided by the embodiments of this application, e.g., the three-dimensionalization method for a two-dimensional image as shown in FIG. 3A to FIG. 3E.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

In summary, by performing the migration on the two-dimensional image from multiple perspectives and generating the migration images of the corresponding perspectives, the embodiments of this application realize the perspective transformation process at the two-dimensional image level, to realize the image three-dimensionalization process at the two-dimensional image processing level, thereby replacing the three-dimensional scene modeling process. The embodiments of this application reduce computational cost and time cost of a backend while accurately performing the three-dimensionalization processing to generate three-dimensional video.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A three-dimensionalization method for a two-dimensional image, performed by an electronic device, and comprising:
    performing depth perception processing on a two-dimensional (2D) image, to obtain depth values of a plurality of pixels in the two-dimensional image;
    performing migration processing on the two-dimensional image from multiple perspectives, to obtain a migration result of the two-dimensional image corresponding to each perspective;
    determining color values of pixels in a migration image corresponding to each perspective, based on the depth values of the pixels in the two-dimensional image and the migration result of the two-dimensional image corresponding to each perspective;

generating, based on the color values of the pixels in the migration image of each perspective, the migration image corresponding to the perspective; and encapsulating the migration images of the multiple perspectives in an order, to obtain a three-dimensional video, wherein the migration processing on the 2D image for each perspective comprises: for a pixel in the plurality of pixels in the 2D image:

determining a horizontal motion vector based on a motion sensitive parameter, a horizontal motion parameter corresponding to the perspective, a depth value of the pixel in the 2D image, and a width of the 2D image;

determining a vertical motion vector based on the motion sensitive parameter, a vertical motion parameter corresponding to the perspective, the depth value of the pixel, and a height of the 2D image; and obtaining an original position where the pixel in the 2D image is located in a migration image canvas of the perspective, and performing displacement processing with the original position as a starting point and according to the horizontal motion vector and the vertical motion vector, to obtain a migration position where the pixel in the 2D image is located in the migration image canvas.

2. The method according to claim 1, wherein the method further comprises:

using the depth values of the plurality of pixels in the two-dimensional image obtained through the depth perception processing as original depth values;

performing depth inpainting processing on the original depth values of the plurality of pixels in the two-dimensional image, to obtain inpainted depth values of the plurality of pixels in the two-dimensional image; and replacing the corresponding original depth values based on the inpainted depth value values of the plurality of pixels.

3. The method according to claim 2, wherein the performing depth inpainting processing on the original depth values of the plurality of pixels in the two-dimensional image, to obtain inpainted depth values of the plurality of pixels in the two-dimensional image comprises:

determining edge pixels in the two-dimensional image and non-edge pixels in the two-dimensional image, based on the original depth values of the plurality of pixels in the two-dimensional image;

determining a pixel that needs to be replaced in the two-dimensional image that needs to undergo median replacement and a retained pixel in the two-dimensional image that does not need to undergo median replacement, based on the edge pixels;

sorting the original depth values of all non-edge pixels in a connected region of the pixel that needs to be replaced in descending order, and using a median of a sort result in the descending order as the inpainted depth value of the pixel that needs to be replaced; and retaining the original depth value of the retained pixel as the inpainted depth value of the retained pixel.

4. The method according to claim 3, wherein the determining edge pixels in the two-dimensional image and non-edge pixels in the two-dimensional image, based on the original depth values of the plurality of pixels in the two-dimensional image comprises:

performing following processing for one pixel in the two-dimensional image:

determining the pixel as the non-edge pixel, if an absolute difference between a regularization processing result of the original depth value of the pixel and a regularization processing result of the original depth value of at least one adjacent pixel is not less than a difference threshold; and determining the pixel as the edge pixel, if the absolute difference between the regularization processing result of the original depth value of the pixel and the regularization processing result of the original depth value of each adjacent pixel is less than the difference threshold;

the adjacent pixel being a pixel located at an adjacent position of the one pixel.

5. The method according to claim 3, wherein the determining a pixel that needs to be replaced in the two-dimensional image that needs to undergo median replacement and a retained pixel in the two-dimensional image that does not need to undergo median replacement, based on the edge pixels comprises:

performing following processing for a pixel in the two-dimensional image:

determining the pixel as the pixel that needs to be replaced if there is at least one edge pixel in a connected region of the pixel; and determining the pixel as the retained pixel if there is no edge pixel in the connected region of the pixel.

6. The method according to claim 1, wherein:

the horizontal motion vector and the vertical motion vector of a pixel is determined based on an updated depth value of the pixel in the two-dimensional image; the updated depth value being in a negative correlation with an inpainted depth value of the corresponding pixel.

7. The method according to claim 1, wherein the migration result of each perspective comprises: a migration position where each pixel of the plurality of pixels in the two-dimensional image is migrated into a migration image canvas of the perspective, the migration image canvas having a same size as the two-dimensional image; and the determining a color values of pixels in a migration image corresponding to each perspective, based on the depth values of the pixels in the two-dimensional image and the migration result of the two-dimensional image corresponding to each perspective comprises:

using each pixel in the migration image of each perspective as a pixel that needs to be dyed, and performing following processing on each pixel that needs to be dyed in the migration image canvas of each perspective:

determining a contribution pixel of the pixel that needs to be dyed, the contribution pixel being a pixel that is in the two-dimensional image and that are associated migration position is located in a connected region of the pixel that needs to be dyed;

determining a contribution weight of the contribution pixel corresponding to the pixel that needs to be dyed, based on the migration position where each pixel in the two-dimensional image is located in the migration image canvas of the perspective, and the depth value of each pixel in the two-dimensional image; and performing weighted processing on a color value of each contribution pixel based on the contribution weight of each contribution pixel, to obtain the color value of the pixel that needs to be dyed.

8. The method according to claim 1, wherein the encapsulating the migration images of the multiple perspectives in an order, to obtain a three-dimensional video comprises:
performing vacant pixel filling processing on the migration image of each perspective, based on the depth values of the pixels in the two-dimensional image;
performing Gaussian blurring processing on a vacant pixel filling result of the migration image of each perspective, to obtain a Gaussian blurring image; and
encapsulating the Gaussian blurring image of each perspective in the order, to obtain the three-dimensional video.

9. The method according to claim 8, wherein the performing vacant pixel filling processing on the migration image of each perspective, based on the depth values of the pixels in the two-dimensional image comprises:
performing following processing for each pixel that needs to be dyed in the migration image of each perspective:
determining a position of the pixel that needs to be dyed as a vacant position, when there is no contribution pixel corresponding to the pixel that needs to be dyed in a connected region of the pixel that needs to be dyed; and
performing following processing for each vacant position in the migration image:
querying a reference pixel of the pixel that needs to be dyed in the connected region of the vacant position, with the vacant position as a center, and based on the depth values of some pixels in the two-dimensional image; and
performing color value filling processing on the pixel that needs to be dyed, based on the color value of the reference pixel.

10. The method according to claim 9, wherein the querying a reference pixel of the pixel that needs to be dyed in the connected region of the vacant position, with the vacant position as a center, and based on the depth values of some pixels in the two-dimensional image comprises:
determining a plurality of sets of query directions with the vacant position as a starting;
each set of query directions comprising a first direction and a second direction that are opposite to each other;
performing following processing for each set of query directions:
determining a pixel of a non-vacant position closest to the vacant position in the first direction within the connected region of the vacant position, and determining a pixel of a non-vacant position closest to the vacant position in the second direction within the connected region of the vacant position;
determining a pixel distance between the pixel determined in the first direction and the pixel determined in the second direction;
determining two pixels corresponding to a minimum pixel distance in the plurality of sets of query directions; and
determining rendering depth values of the two pixels based on the depth values of the some pixels in the two-dimensional image, and determining the pixel with a larger rendering depth value as the reference pixel of the pixel that needs to be dyed.

11. The method according to claim 10, wherein
the migration result of each perspective comprises: a migration position where each pixel of the plurality of pixels in the two-dimensional image is migrated into a migration image canvas of the perspective, the migration image canvas having a same size as the two-dimensional image;
the some pixels are contribution pixels of a target pixel; and
the determining rendering depth values of the two pixels based on the depth values of the some pixels in the two-dimensional image comprises:
using one of the two pixels as the target pixel, and performing following processing:
determining the contribution pixels of the target pixel, the contribution pixels being pixels that are in the two-dimensional image and associated with migration positions that are located in a connected region of the target pixel;
determining contribution weights of the contribution pixels to the target pixel, based on the migration positions where the contribution pixels are located in the migration image canvas of the perspective; and
performing weighted processing on the depth values of the contribution pixels based on the contribution weights of the contribution pixels, to obtain the rendering depth values of the two pixels.

12. The method according to claim 1, further comprising:
displaying the two-dimensional image on a human-computer interaction interface; and
playing the three-dimensional video generated based on the two-dimensional image, in response to a three-dimensionalization operation for the two-dimensional image.

13. A three-dimensionalization apparatus for a two-dimensional image, comprising:
a memory, configured to store executable instructions; and
a processor, configured to, when executing the executable instruction stored in the memory, perform:
performing depth perception processing on a two-dimensional (2D) image, to obtain depth values of a plurality of pixels in the two-dimensional image;
performing migration processing on the two-dimensional image from multiple perspectives, to obtain a migration result of the two-dimensional image corresponding to each perspective;
determining color values of pixels in a migration image corresponding to each perspective, based on the depth values of the pixels in the two-dimensional image and the migration result of the two-dimensional image corresponding to each perspective;
generating, based on the color values of the pixels in the migration image of each perspective, the migration image corresponding to the perspective; and
encapsulating the migration images of the multiple perspectives in an order, to obtain a three-dimensional video,
wherein the migration processing on the 2D image for each perspective comprises: for a pixel in the plurality of pixels in the 2D image:
determining a horizontal motion vector based on a motion sensitive parameter, a horizontal motion parameter corresponding to the perspective, a depth value of the pixel in the 2D image, and a width of the 2D image;
determining a vertical motion vector based on the motion sensitive parameter, a vertical motion parameter corresponding to the perspective, the depth value of the pixel, and a height of the 2D image; and obtaining an original position where the pixel in the 2D image is located in a migration image canvas of the perspective, and performing displacement processing with the original position as a starting point and according to the horizontal motion vector and the vertical motion vector, to obtain a migration position where the pixel in the 2D image is located in the migration image canvas.

14. The apparatus according to claim 13, wherein the processor is further configured to perform:
   using the depth values of the plurality of pixels in the two-dimensional image obtained through the depth perception processing as original depth values;
   performing depth inpainting processing on the original depth values of the plurality of pixels in the two-dimensional image, to obtain inpainted depth values of the plurality of pixels in the two-dimensional image; and
   replacing the corresponding original depth values based on the inpainted depth value values of the plurality of pixels.

15. The apparatus according to claim 14, wherein the performing depth inpainting processing on the original depth values of the plurality of pixels in the two-dimensional image, to obtain inpainted depth values of the plurality of pixels in the two-dimensional image comprises:
   determining edge pixels in the two-dimensional image and non-edge pixels in the two-dimensional image, based on the original depth values of the plurality of pixels in the two-dimensional image;
   determining a pixel that needs to be replaced in the two-dimensional image that needs to undergo median replacement and a retained pixel in the two-dimensional image that does not need to undergo median replacement, based on the edge pixels;
   sorting the original depth values of all non-edge pixels in a connected region of the pixel that needs to be replaced in descending order, and using a median of a sort result in the descending order as the inpainted depth value of the pixel that needs to be replaced; and
   retaining the original depth value of the retained pixel as the inpainted depth value of the retained pixel.

16. The apparatus according to claim 15, wherein the determining edge pixels in the two-dimensional image and non-edge pixels in the two-dimensional image, based on the original depth values of the plurality of pixels in the two-dimensional image comprises:
   performing following processing for one pixel in the two-dimensional image:
   determining the pixel as the non-edge pixel, if an absolute difference between a regularization processing result of the original depth value of the pixel and a regularization processing result of the original depth value of at least one adjacent pixel is not less than a difference threshold; and
   determining the pixel as the edge pixel, if the absolute difference between the regularization processing result of the original depth value of the pixel and the regularization processing result of the original depth value of each adjacent pixel is less than the difference threshold;
   the adjacent pixel being a pixel located at an adjacent position of the one pixel.

17. The apparatus according to claim 15, wherein the determining a pixel that needs to be replaced in the two-dimensional image that needs to undergo median replacement and a retained pixel in the two-dimensional image that does not need to undergo median replacement, based on the edge pixels comprises:
   performing following processing for a pixel in the two-dimensional image:
   determining the pixel as the pixel that needs to be replaced if there is at least one edge pixel in a connected region of the pixel; and
   determining the pixel as the retained pixel if there is no edge pixel in the connected region of the pixel.

18. A non-transitory computer-readable storage medium, storing an executable instruction, the executable instruction, when executed by at least one processor, causing the at least one processor to perform:
   performing depth perception processing on a two-dimensional (2D) image, to obtain a depth values of a plurality of pixels in the two-dimensional image;
   performing migration processing on the two-dimensional image from multiple perspectives, to obtain a migration result of the two-dimensional image corresponding to each perspective;
   determining color values of pixels in a migration image corresponding to each perspective, based on the depth values of the pixels in the two-dimensional image and the migration result of the two-dimensional image corresponding to each perspective;
   generating, based on the color values of the pixels in the migration image of each perspective, the migration image corresponding to the perspective; and
   encapsulating the migration images of the multiple perspectives in an order, to obtain a three-dimensional video,
   wherein the migration processing on the 2D image for each perspective comprises: for a pixel in the plurality of pixels in the 2D image:
   determining a horizontal motion vector based on a motion sensitive parameter, a horizontal motion parameter corresponding to the perspective, a depth value of the pixel in the 2D image, and a width of the 2D image;
   determining a vertical motion vector based on the motion sensitive parameter, a vertical motion parameter corresponding to the perspective, the depth value of the pixel, and a height of the 2D image; and
   obtaining an original position where the pixel in the 2D image is located in a migration image canvas of the perspective, and performing displacement processing with the original position as a starting point and according to the horizontal motion vector and the vertical motion vector, to obtain a migration position where the pixel in the 2D image is located in the migration image canvas.

19. The computer-readable storage medium according to claim 18, wherein the executable instruction further cause the at least one processor to perform:
   using the depth values of the plurality of pixels in the two-dimensional image obtained through the depth perception processing as original depth values;
   performing depth inpainting processing on the original depth values of the plurality of pixels in the two-dimensional image, to obtain inpainted depth values of the plurality of pixels in the two-dimensional image; and
   replacing the corresponding original depth values based on the inpainted depth value values of the plurality of pixels.

20. The computer-readable storage medium according to claim 19,
  wherein the performing depth inpainting processing on the original depth values of the plurality of pixels in the two-dimensional image, to obtain inpainted depth values of the plurality of pixels in the two-dimensional image comprises:
  determining edge pixels in the two-dimensional image and non-edge pixels in the two-dimensional image, based on the original depth values of the plurality of pixels in the two-dimensional image;
  determining a pixel that needs to be replaced in the two-dimensional image that needs to undergo median replacement and a retained pixel in the two-dimensional image that does not need to undergo median replacement, based on the edge pixels;
  sorting the original depth values of all non-edge pixels in a connected region of the pixel that needs to be replaced in descending order, and using a median of a sort result in the descending order as the inpainted depth value of the pixel that needs to be replaced; and
  retaining the original depth value of the retained pixel as the inpainted depth value of the retained pixel.

* * * * *